(12) United States Patent
Kameishi et al.

(10) Patent No.: US 9,335,404 B2
(45) Date of Patent: May 10, 2016

(54) ULTRASOUND DIAGNOSIS APPARATUS AND POWER SUPPLY

(71) Applicants: Kabushiki Kaisha Toshiba, Minato-ku (JP); Toshiba Medical Systems Corporation, Otawara-shi (JP)

(72) Inventors: Wataru Kameishi, Nasushiobara (JP); Hiroyuki Shibanuma, Yaita (JP); Shuta Fujiwara, Nasushiobara (JP); Satoshi Kamiyama, Otawara (JP); Takayuki Shiina, Otawara (JP); Masaaki Ishitsuka, Nasushiobara (JP); Tomohiro Fujita, Nasushiobara (JP)

(73) Assignees: Kabushiki Kaisha Toshiba, Minato-ku (JP); Toshiba Medical Systems Corporation, Otawara-shi (JP)

( * ) Notice: Subject to any disclaimer, the term of this patent is extended or adjusted under 35 U.S.C. 154(b) by 27 days.

(21) Appl. No.: 14/353,230

(22) PCT Filed: Apr. 19, 2013

(86) PCT No.: PCT/JP2013/061626
§ 371 (c)(1),
(2) Date: Apr. 21, 2014

(87) PCT Pub. No.: WO2013/157633
PCT Pub. Date: Oct. 24, 2013

(65) Prior Publication Data
US 2014/0307521 A1    Oct. 16, 2014

(30) Foreign Application Priority Data

Apr. 20, 2012 (JP) .................. 2012-096312
Apr. 19, 2013 (JP) .................. 2013-088202

(51) Int. Cl.
*G01S 7/52* (2006.01)
*B06B 1/02* (2006.01)
*G01S 15/89* (2006.01)

(52) U.S. Cl.
CPC ........... *G01S 7/52096* (2013.01); *B06B 1/0215* (2013.01); *G01S 7/5202* (2013.01); *B06B 2201/76* (2013.01); *G01S 15/8963* (2013.01); *Y10T 307/549* (2015.04)

(58) Field of Classification Search
CPC ............. G01S 7/5202; G01S 7/52096; G01S 15/8963; B06B 1/0215; B06B 2201/76; Y10T 307/549
See application file for complete search history.

(56) References Cited

U.S. PATENT DOCUMENTS

| 6,424,188 | B2 | 7/2002 | Kominami |
| 2002/0017930 | A1 | 2/2002 | Kominami |
| 2014/0307521 | A1* | 10/2014 | Kameishi et al. ............. 367/7 |

FOREIGN PATENT DOCUMENTS

| JP | 2002 57728 | 2/2002 |
| JP | 2006 15071 | 1/2006 |
| JP | 2010 81966 | 4/2010 |
| WO | WO 2013157633 A1 * | 10/2013 |

OTHER PUBLICATIONS

Translation of JP2010081966.*
Combined Office Action and Search Report issued May 6, 2015 in Chinese Patent Application No. 201380004315.7 ( with English translation of Category of Cited Documents).
International Search Report Issued Jul. 23, 2013 in PCT/JP13/061626 Filed Apr. 19, 2013.

* cited by examiner

*Primary Examiner* — Daniel Pihulic
(74) *Attorney, Agent, or Firm* — Oblon, McClelland, Maier & Neustadt, L.L.P

(57) ABSTRACT

An ultrasound diagnosis apparatus in comprising a transformer, a first power source and a second power source, an ultrasound transducer, a processor, and a driving part. The transformer comprises a primary winding and a secondary winding. The first power source and the second power source are connected to the primary winding. The ultrasound transducer is driven by the voltage induced to the secondary winding, and transmits ultrasound waves to a subject, and receives reflected waves reflected by the subject to output the received signal. The processor implements processing on the received signal to generate ultrasound wave images. The driving part drives to change the voltage among a first level voltage based on the first power source, a second level voltage based on the second power source, and a third level voltage between the first level voltage and the second level voltage.

11 Claims, 23 Drawing Sheets

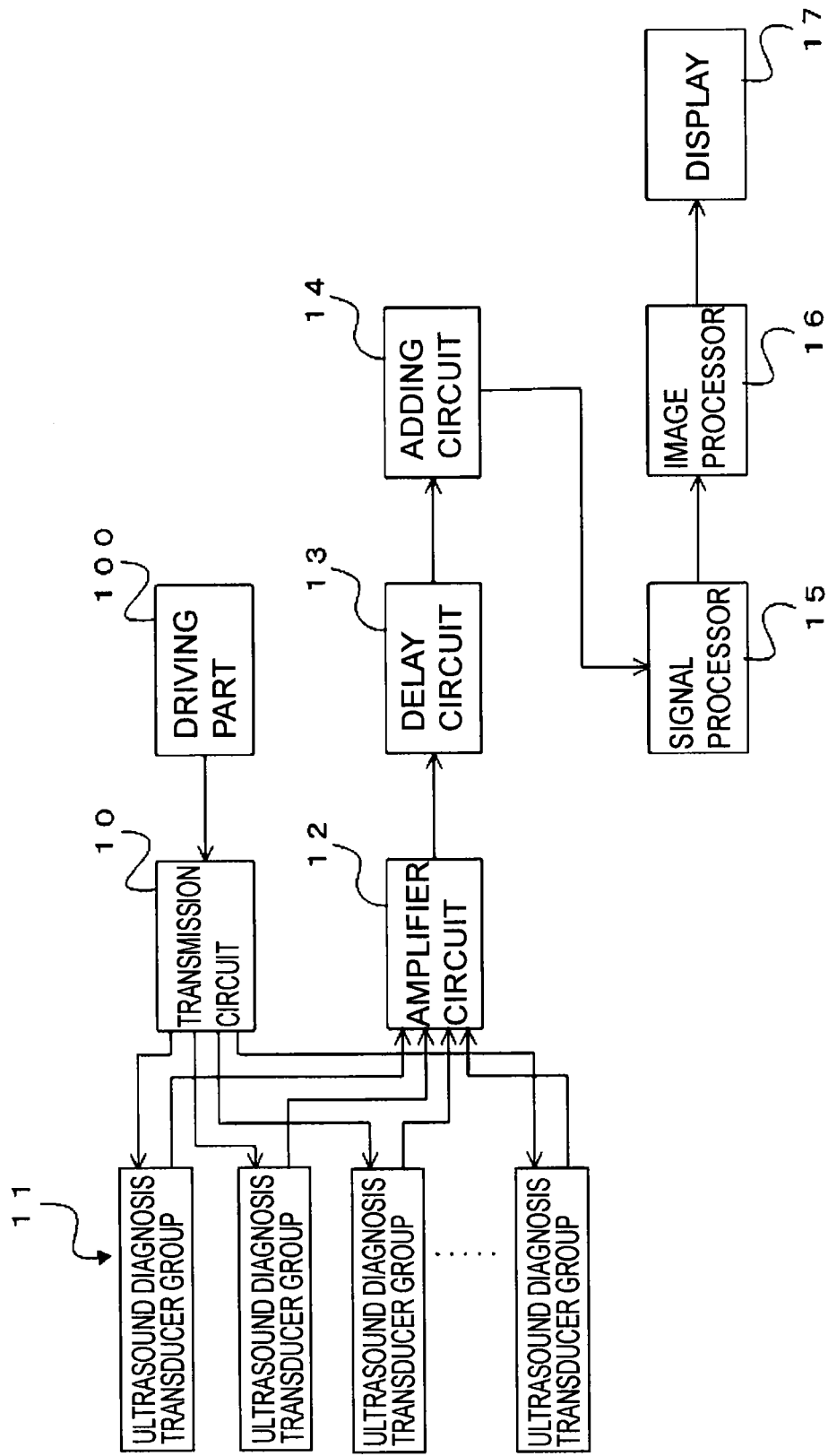

FIG. 2C

|     | T10 | T11 | T12 |
|-----|-----|-----|-----|
| M11 |     | ○   |     |
| M12 | ○   | ○   |     |
| M13 |     |     | ○   |
| M14 | ○   |     | ○   |

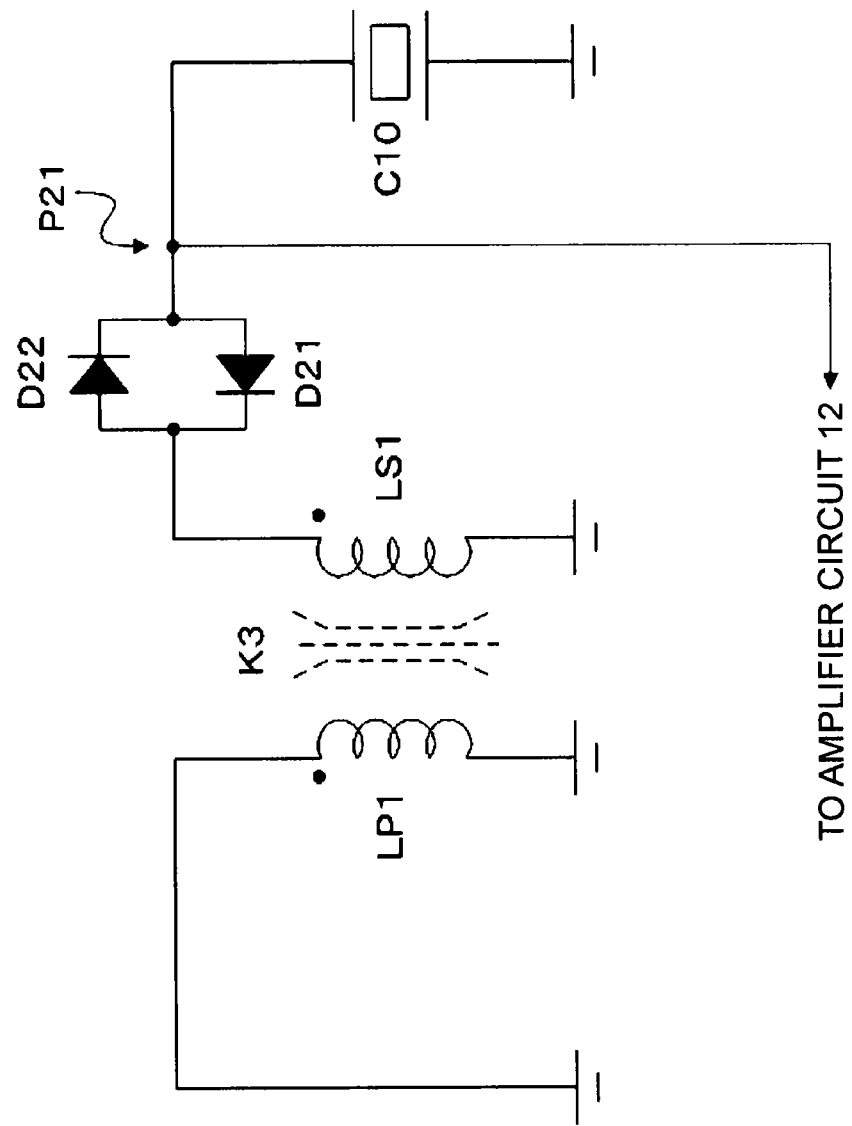

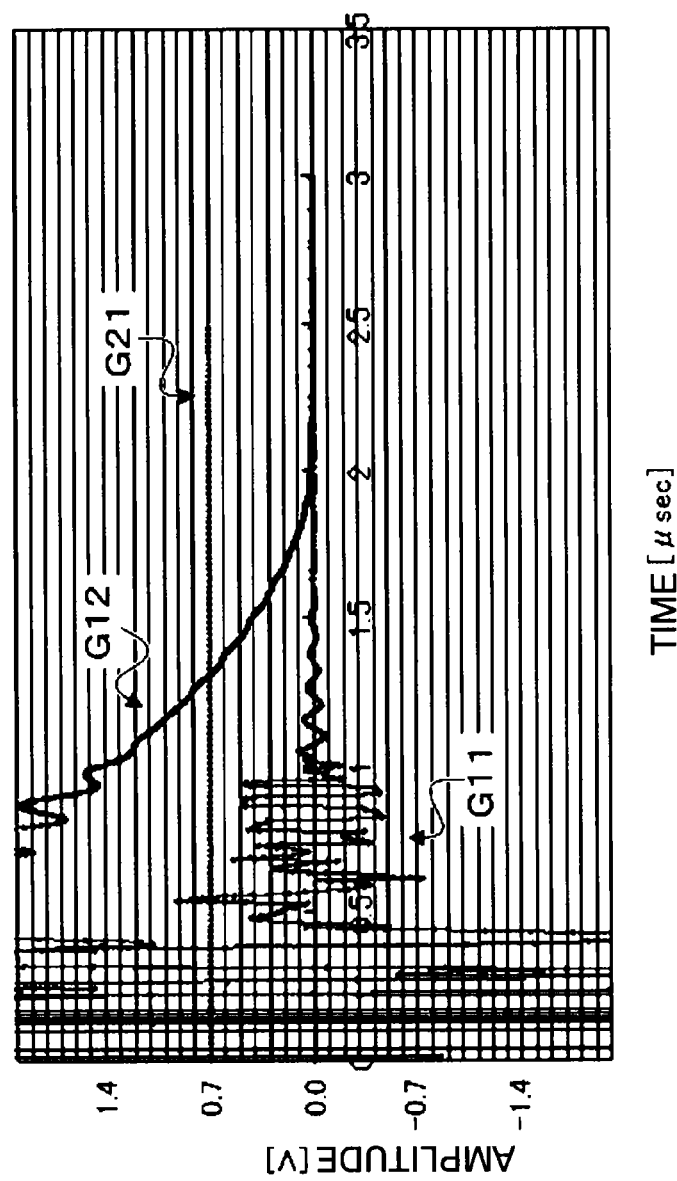

FIG. 5C

|  | T20 | T21 | T22 | T23 | T24 |
|---|---|---|---|---|---|
| M11 |  | ○ |  |  |  |
| M12 | ○ | ○ | ○ |  |  |
| M13 |  |  |  |  | ○ |
| M14 | ○ |  |  | ○ | ○ |
| M15 |  |  | ○ |  |  |
| M16 |  |  |  | ○ |  |

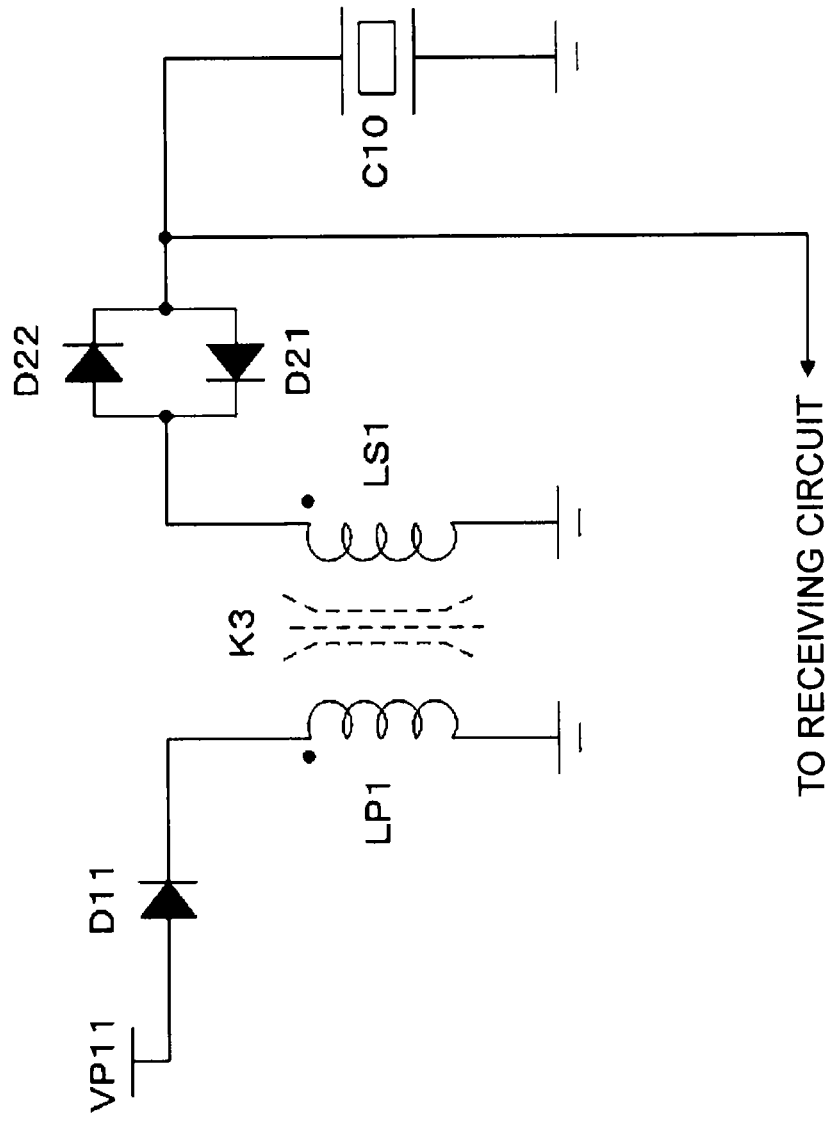

FIG. 8
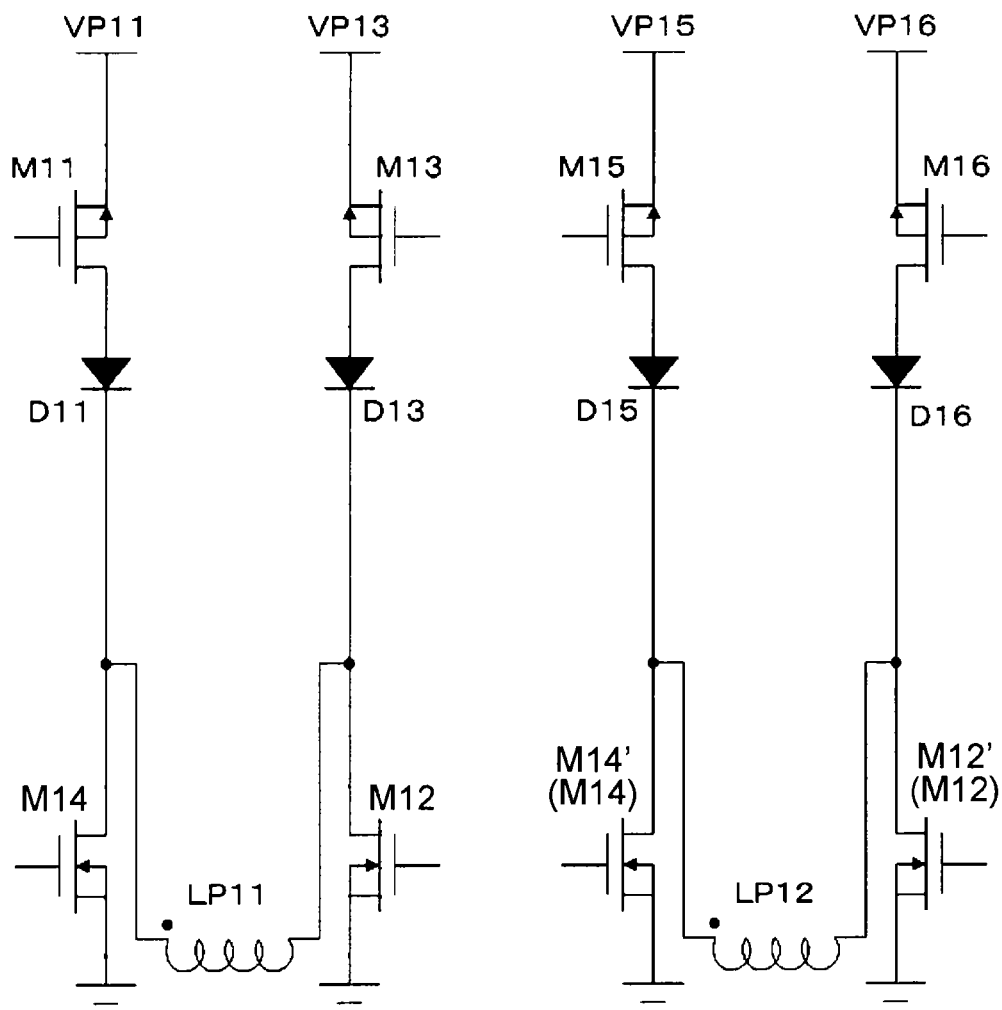
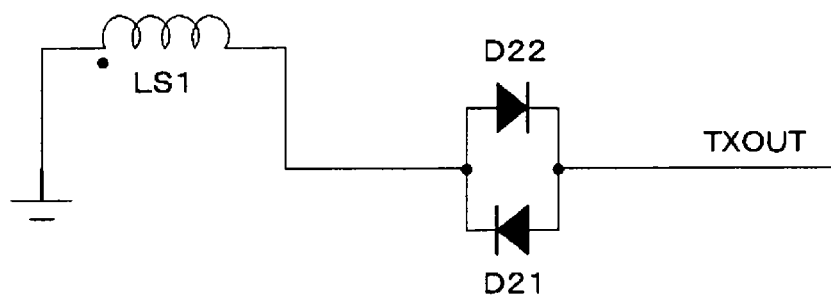

FIG. 9A
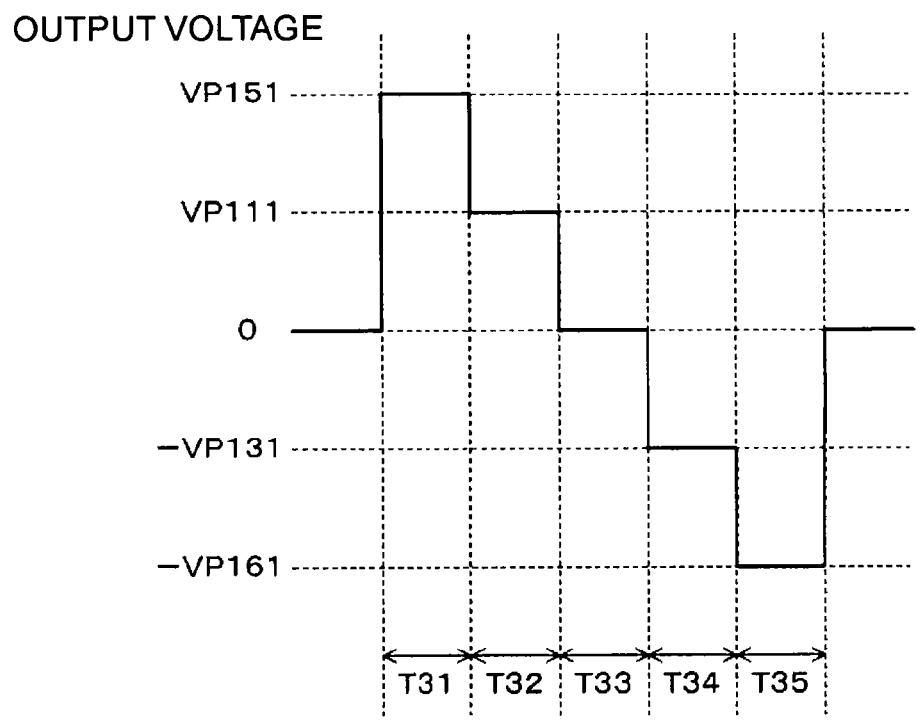
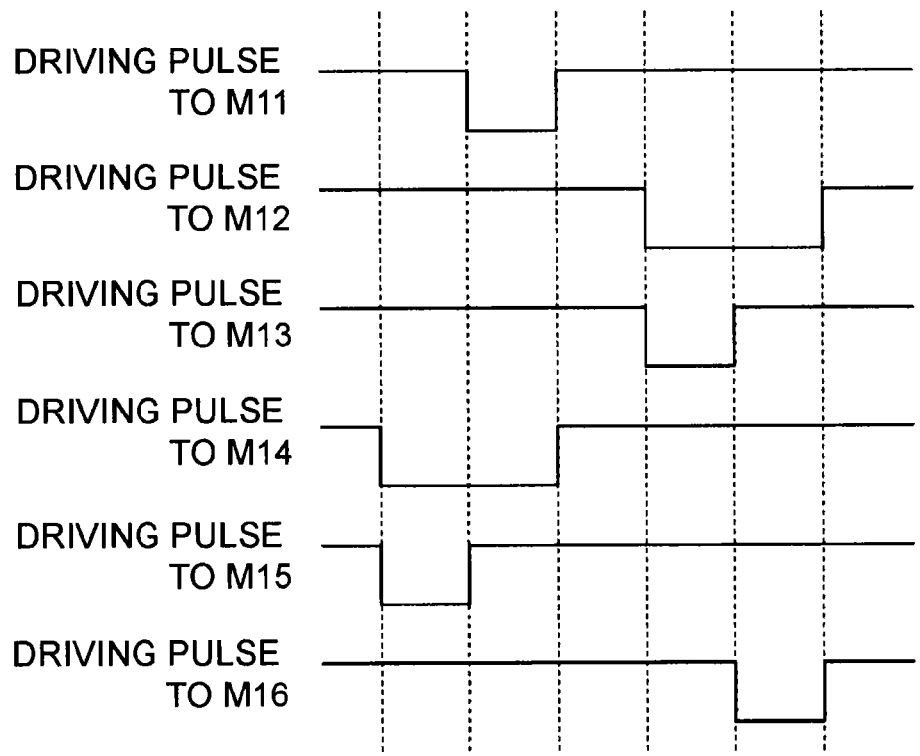

FIG. 9B

|  | T31 | T32 | T33 | T34 | T35 |
|---|---|---|---|---|---|
| M11 |  | ○ |  |  |  |
| M12 | ○ | ○ | ○ |  |  |
| M13 |  |  |  | ○ |  |
| M14 |  |  | ○ | ○ | ○ |
| M15 | ○ |  |  |  |  |
| M16 |  |  |  |  | ○ |

ULTRASOUND DIAGNOSIS APPARATUS AND POWER SUPPLY

TECHNICAL FIELD

The embodiments of the present invention relate to an ultrasound diagnosis apparatus and a power supply.

BACKGROUND ART

An ultrasound diagnosis apparatus transmits ultrasound waves to the inside of a subject by using an ultrasound probe having a plurality of ultrasound transducers, and based on the reflected wave (ultrasound echo) from the subject, generates tomographic image data, three dimensional image data, of the inside of the subject, and the like.

There is also a technique called Tissue Harmonic Imaging which generates ultrasound images utilizing the harmonic components (second harmonic components) of the ultrasound waves. This technique performs transmission of the ultrasound waves twice in the same direction, and then causes phase of the first transmission waves and the second transmission waves to reverse. At this time, with respect to that of the first receiving waves, the phase of the fundamental wave components of the receiving waves caused by the second transmission waves is reversed, and the second harmonic components thereof become the same phase. Therefore, when the first receiving waves and the second receiving waves are added together, the fundamental waves thereof are canceled each other, and only the second harmonic components are emphasized (doubled) to output. Thereby, it makes it possible to visualize only the second harmonic components. It makes it possible, for example, to suppress the effects of multiple reflections of the transmission waves by utilizing such the technique.

Further, there is a case that the ultrasound diagnosis apparatus has a configuration such that a power supply is connected to a primary winding of a transformer to apply a voltage thereto, and then ultrasound transducers are driven by the voltage induced in a secondary winding. According to such the configuration, the direction of the voltage applied to the primary winding is switched to reverse the polarity of the pulse induced to the secondary winding.

PRIOR ART DOCUMENT

Patent Document

[Patent Document 1] Japanese Unexamined Patent Application Publication No. 2010-81966

SUMMARY OF THE INVENTION

Problems to be Solved by the Invention

On the other hand, since the primary winding and the secondary winding are magnetically connected in the transformer, the voltage generated in the primary winding appears as the voltage, corresponding to the winding ratio, of the secondary winding by supplying a current into the primary winding. At this time, when the electricity supply to the primary winding from the outside is terminated, counter electromotive force corresponding to the load of the primary winding is generated to cause, according to Lenz's law, to counterbalance the change of the magnetic. A voltage corresponding to the winding ratio is therefore generated in the secondary winding by the counter electromotive force. Thereby, even if the current supplied to the primary winding from the outside is terminated, the voltage of the secondary winding is not returning to 0 level (bias point) immediately, the counter electromotive force is continuously induced in the secondary winding, and the signals accompanying the counter electromotive force is continuously generated from the secondary winding. For that reason, during this time, the signal accompanying the counter electromotive force is superposed on the receiving signal from the ultrasound transducer, it has been therefore difficult to receive the reflected waves of, for example, a shallow part of the subject (hereinafter, it may refers to a "shallow part").

The embodiments of the present invention are intended to provide an ultrasound diagnosis apparatus in which electromotive force induced in a secondary winding can be varied to zero level at high speed.

Means of Solving the Problems

The ultrasound diagnosis apparatus of the embodiments comprises a transformer, a first power source and a second power source, an ultrasound transducer, a processor, and a driving part. The transformer comprises a primary winding and a secondary winding. The first power source and the second power source are connected to the primary winding. The ultrasound transducer is driven by the voltage induced to the secondary winding, and transmits ultrasound waves to a subject, and receives reflected waves reflected by the subject to output the received signal. The processor implements processing on the received signal to generate ultrasound wave images. The driving part drives to change the voltage among a first level voltage based on the first power source, a second level voltage based on the second power source, and a third level voltage between the first level voltage and the second level voltage.

BRIEF DESCRIPTION OF THE DRAWINGS

FIG. 1 It is a block diagram of an ultrasound diagnosis apparatus according to the present embodiments.

FIG. 2C It is a diagram illustrating an ON/OFF state of each transistor at each timing in the first embodiment.

FIG. 3C It is a circuit diagram illustrating an equivalent circuit at a predetermined timing in the first embodiment.

FIG. 4 It is a graph illustrating a change in pulse amplitude output from the secondary winding.

FIG. 5C It is a diagram illustrating an ON/OFF state of each transistor at each timing in FIG. 5B.

FIG. 6A It is a circuit diagram illustrating an equivalent circuit at a predetermined timing in the second embodiment.

FIG. 8 It is a circuit diagram illustrating a mode for the transmission circuit according to the second embodiment.

FIG. 9A It is schematic diagram illustrating an example of relationships between pulses to each transistor and output waveforms from the secondary winding.

FIG. 9B It is a diagram illustrating an ON/OFF state of each transistor in FIG. 9A.

MODES FOR CARRYING OUT THE INVENTION

First Embodiment

Figure 2A:
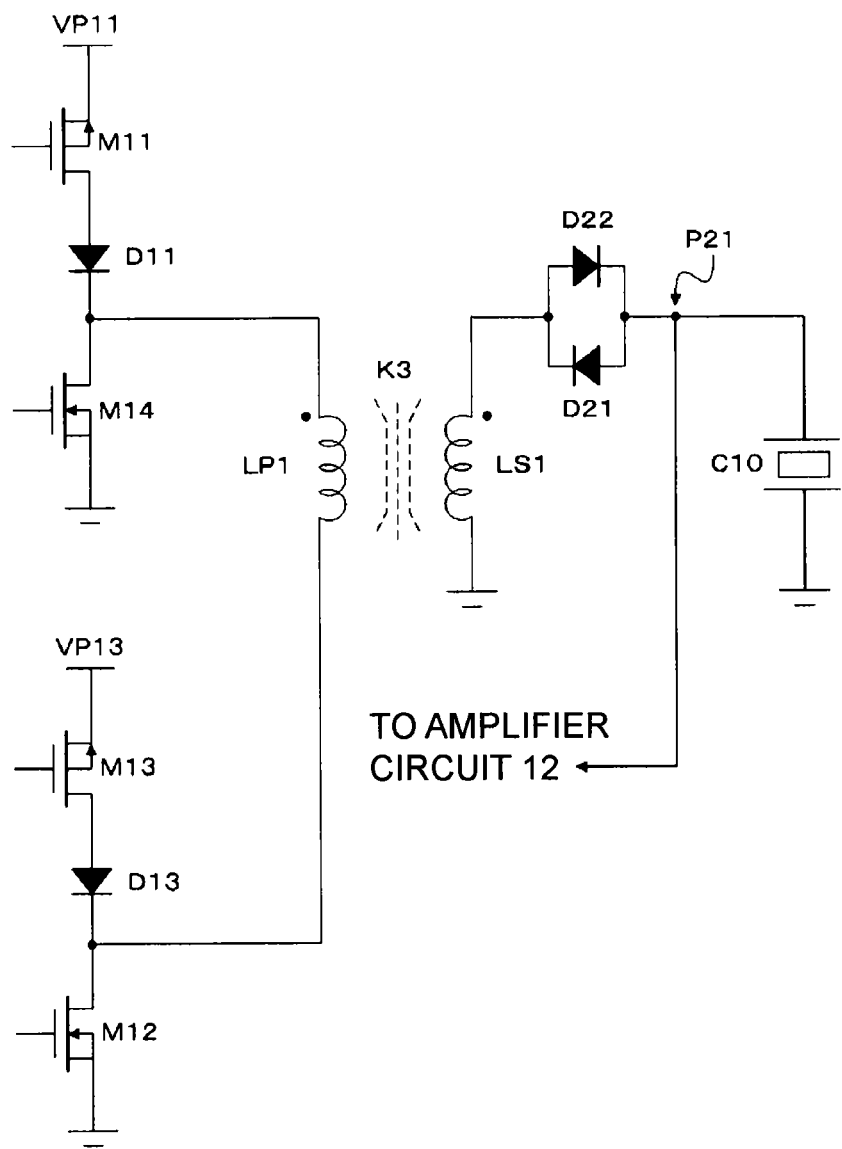
FIG. 2A It is a circuit diagram illustrating an example of a transmission circuit according to a first embodiment.

Firstly, the configuration of an ultrasound diagnosis apparatus according to a first embodiment will be described with reference to FIG. 1 and FIG. 2A. As shown in FIG. 1, the ultrasound diagnosis apparatus comprises a transmission circuit 10, a driving part 100, an ultrasound transducer group 11, an amplifier circuit 12, a delay circuit 13, an adding circuit 14, a signal processor 15, an image processor 16, and a display 17. The ultrasound diagnosis apparatus according to the present embodiment operates while switching transmission and reception of ultrasound waves at a predetermined timing.
(Transmission Circuit 10)

Here, the configuration of the transmission circuit 10, as well as an ultrasound transducer C10 which configures the ultrasound transducer group 11 will be described, with reference to FIG. 2A. The transmission circuit 10 comprises a transformer K3, power sources VP11 and VP13, transistors M11, M12, M13, and M14, and diodes D11, D13, D21 and D22. The transformer K3 comprises a primary winding LP1, and a secondary winding LS1. Also, in FIG. 2A, a dotted line shows a core part of the transformer K3. In the example in FIG. 2A, each of the transistors M11 and M13 is P-type MOSFET (Metal-Oxide-Semiconductor Field-Effect Transistor), and each of the transistors M12 and M14 is N-type MOSFET.

The power source VP11 is connected to the source of the transistor M11, and the power source VP13 is connected to the source of the transistor M13. Also, the sources of the transistors M12 and M14 are connected to a common voltage. Here, the common voltage is a voltage (ground) acts as a reference in common within a circuit. One end of the primary winding LP1 is connected to the drain of the transistor M11 and the drain of the transistor M14. Further, the diode D11 is interposed between the one end of the primary winding LP1 and the drain of the transistor M11, in order to regulate the current flow in the direction from the primary winding LP1 to the transistor M11. Similarly, the other end of the primary winding LP1 is connected to the drain of the transistor M13 and the drain of the transistor M12. The diode D13 is interposed between the other end of the primary winding LP1 and the drain of the transistor M13, in order to regulate the current flow in the direction from the primary winding LP1 to the transistor M13. In addition, the power supply VP11 corresponds to a "first power supply", and the power supply VP13 corresponds to a "second power supply". That is, the power supply VP11 and the power supply VP13 are arranged by interposing the primary winding LP1, and each can supply a current in the opposite direction each other. Also, the power supply VP11 may be a power supply which generates a voltage different from the one generated from the power supply VP13, or may be a power supply which generates a voltage as same as the one generated from the power supply VP13. Further, the transistor M11 corresponds to a "first switch", and the transistor M13 corresponds to a "second switch". Furthermore, the transistor M12 corresponds to a "third switch", and the transistor M14 corresponds to a "fourth switch".

The ultrasound transducer C10 which configures the ultrasound transducer group 11 is connected to one end of the secondary winding LS1 and a receiving circuit (that is, the amplifier circuit 12). The connection part of the wirings respectively connected to the ultrasound transducer C10, the one end of the secondary winding LS1, and the receiving circuit designates a connection point P21. In addition, the other end of the secondary winding LS1 is connected to the common voltage. A diode switch which is configured by the diodes D21 and D22 is interposed between the one end of the secondary winding LS1 and the connecting point P21. The diodes D21 and D22 in this case are arranged so that the anode terminal of either one of these diodes and the cathode terminal of the other are connected to the same signal line.

The diodes D21 and D22 become ON states when, for example, a passing signal (pulse wave, or continuous wave) has amplitude of 1.4 Vpp (equivalent to the voltage±0.7V) or more, and work to pass the signal. On the other hand, when the amplitude is less than 1.4 Vpp, the diodes become OFF states, and work to terminate the signal. At the time of driving the ultrasound transducer C10 (that is, at the time of transmitting the ultrasound waves), the signal induced in the secondary winding LS1 passes the diode switch, since the signal has amplitude of 20 Vpp (equivalent to the voltage±10V) to 200 Vpp (equivalent to the voltage±100V). Whereas, at the time of receiving an echo signal from the ultrasound transducer C10, since the echo signal has amplitude of less than 1.0 Vpp (equivalent to the voltage±0.5V), the signal is terminated at the diode switch and output to the receiving circuit (that is, the amplifier circuit 12). In this way, when the voltage of the transmission circuit side (that is, the secondary winding LS1) is lowered, arranging the diode switch makes the loads of the transmission circuit side undetectable from the receiving circuit. It means that it is possible to separate the influence on the transmission circuit side from the receiving circuit.

A limiter, which restricts any signal having a predetermined amplitude (for example, ±0.7V) or more from passing therethrough, is arranged in the input stage of the amplifier circuit 12. In the case that the signal directed to the amplifier circuit 12 has amplitude of ±0.7V or more, this limiter restricts the signal pass through the amplifier circuit 12.

The driving part 100 switches ON/OFF of each transistor M11 to M14 at each of predetermined timings, thereby controlling the kinds and directions of the voltage (primary voltage) to be applied to the primary winding LP1. The control of the driving part 100 will be described with reference to FIG. 2B and FIG. 2C. FIG. 2B is a schematic diagram illustrating relationships between pulses to each transistor M11 to M14 and the output waveforms from the secondary winding LS1. T10, T11 and T12 in FIG. 2B show each of the timings during a period of transmitting the ultrasound waves. As the voltage (second voltage) induced to the secondary winding LS1 changes at each of the timings, the voltages of a plurality of levels can be output. As an example for the case, VP111 and VP131 in FIG. 2B show the secondary voltage induced in the secondary side (that is, the secondary winding LS1) of the transformer K3 by switching the transistors M11 to M14. In FIG. 2B, the voltage VP111 is an example of a voltage of a first level, and corresponds to the power source VP11, and the voltage VP131 is an example of a voltage of a second level, and corresponds to the power source VP13. Further, FIG. 2C is a diagram illustrating an ON/OFF state of each transistor M11 to M14 at each of the timings T10, T11 and T12 in FIG. 2B. In FIG. 2C, the part shown by "○" indicates the "ON" state.

As shown FIG. 2B, at the timing T11, the driving part 100 supplies pulses to the transistors M12 and M13. Thereby, as shown in FIG. 2C, the transistors M11 and M12 become ON, and the transistors M13 and M14 become OFF. At the time of the equivalent circuit is shown in FIG. 3A. As shown in FIG. 3A, at the timing T11, the primary voltage of the power supply VP11 is applied to the primary winding LP1. Thereby, as shown in FIG. 2B, the secondary voltage of VP111 (positive electrode) is induced in the secondary winding LS1, and the induced voltage is applied to the ultrasound transducer C10.

Further, as shown in FIG. 2B, at the timing T12, the driving part 100 supplies pulses to the transistors M11 and M14. Thereby, as shown in FIG. 2C, the transistors M13 and M14 become ON, and the transistors M11 and M12 become OFF. At the time of the equivalent circuit is shown in FIG. 3B. As shown in FIG. 3B, at the timing T12, the primary voltage of the power supply VP13 is applied to the primary winding LP1. At this time, the direction of the current flowing into the primary winding LP1 becomes contrary to the case of the timing T11 shown in FIG. 3A. Therefore, as shown in FIG. 2B, the secondary voltage of VP131 (negative electrode) is induced in the secondary winding LS1, and applied to the ultrasound transducer C10.

Also, as shown in FIG. 2B, at the timing T10, the driving part 100 supplies pulses to the transistors M11 to M14. Thereby, as shown in FIG. 2C, the transistors M12 and M14 become ON, and the transistors M11 and M13 become OFF. At the time of the equivalent circuit is shown in FIG. 3C. As shown in FIG. 3C, at the timing T10, the both ends of the primary winding LP1 are connected to the common voltage. Thereby, at the timing T11 or T12, the voltage difference generated at the both ends of the secondary winding LS1 becomes 0V by making the potential difference between the both ends of the primary winding LP1 be 0 (the applied voltage to the primary winding LP1 becomes 0). Thereby, as shown in FIG. 2B, the output amplitude from the secondary winding LS1 becomes 0 which is the voltage of a third level (the voltage induced in the secondary winding becomes 0), therefore, the voltage applied to the ultrasound transducer C10 becomes 0. That is, the voltage of the first level and the voltage of the second level are any signals other than 0, and when the voltage is switched to the 0 level of the third level voltage, the signal falls drastically if the signal is more than 0, and rises drastically if the signal is less than 0. These rising and falling of the signal are performed preferably perpendicular to the time axis, however, they may be converged to the 0 level of the third level voltage, for example, by having some tilts and/or after some ringing.

Here, switching to 0 level of the third level voltage will be described with reference to FIG. 4. FIG. 4 is an example of a graph illustrating a change in pulse amplitude output from the secondary winding LS1 along a time series, in the case that the voltage applied to the primary winding LP1 is OFF. The graph G11 in FIG. 4 shows the case, in the ultrasound diagnosis apparatus according to the present embodiment, that the control at the timing T10, that is when the both ends of the primary winding LP1 are connected to the common voltage. Further, the graph G12 shows a limiter voltage of the limiter arranged in the input stage of the amplifier circuit 12. The graph G12 also shows the case that the conventional transmission circuit is used, that is, the case that the both ends of the primary winding LP1 are unconnected to the common voltage.

In this way, when the transistors M11 and M12 are ON, the driving part 100 induces the first level voltage to the secondary winding LS1. Also, when the transistors M13 and M14 are ON, the driving part 100 induces the second level voltage to the secondary winding LS1. Further, when the transistors M12 and M14 are ON, the driving part 100 causes to connect the both ends of the primary winding LP1 to the common voltage to cause the output amplitude from the secondary winding LS1 to be 0.

Figure 11A:
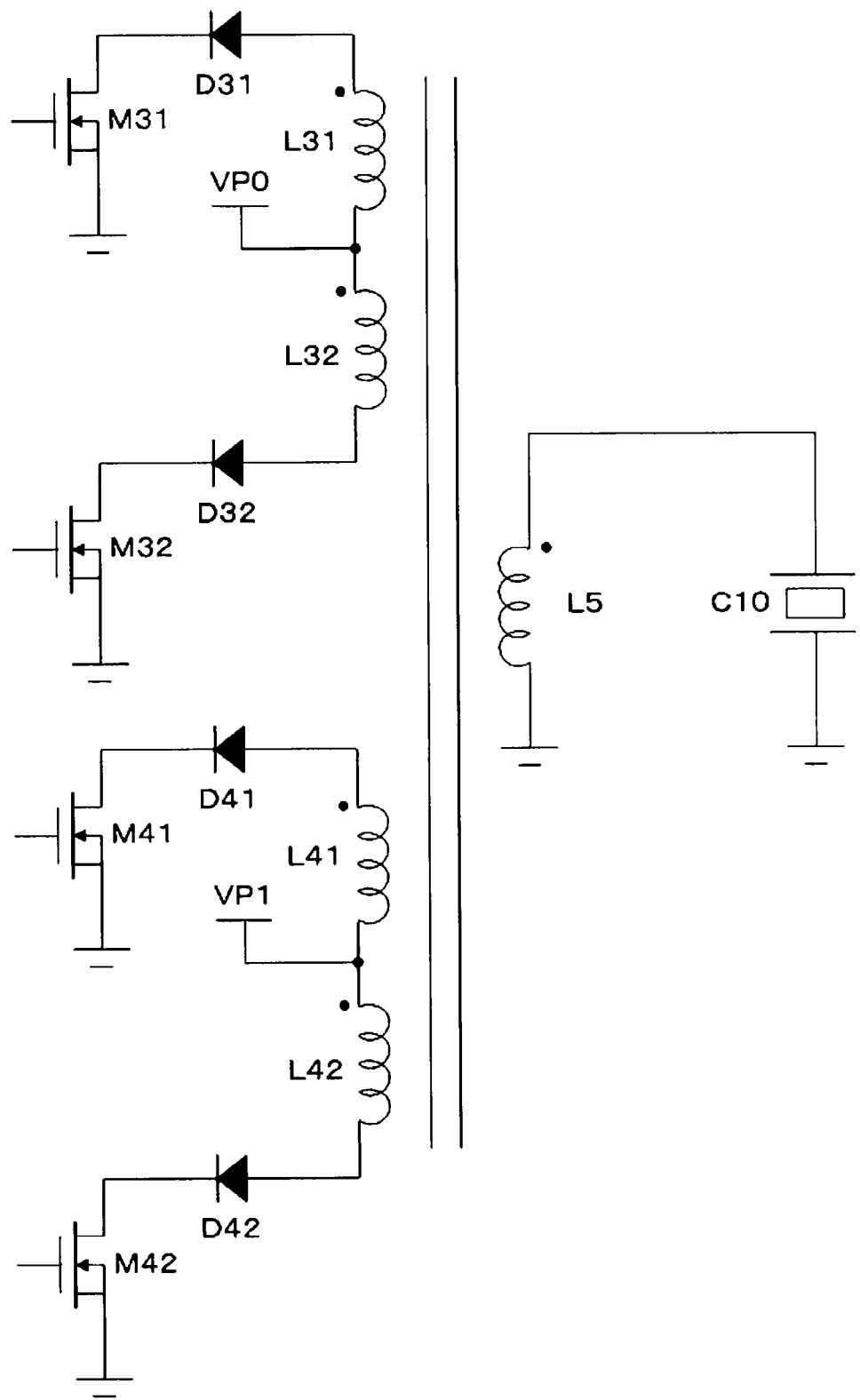
FIG. 11A It is a circuit diagram illustrating an example of a conventional transmission circuit.

Here, the configuration of a conventional transmission circuit will be described with reference to FIG. 11A. FIG. 11A is a circuit diagram showing an example of a conventional transmission circuit. As shown in FIG. 11A, the conventional transmission circuit comprises a transformer including primary windings L31, L32, L41, and L42, and a secondary winding L5, as well as, power supplies VP0 and VP1. One ends of the primary windings L31 and L32 are connected to the power supply VP0. In this case, seen from the power supply VP0, the primary windings L31 and L32 are connected so that their winding directions are different from each other. The other end of the primary winding L31 is connected to the drain of a transistor M31 via a diode D31. Similarly, the other end of the primary winding L32 is connected to the drain of a transistor M32 via a diode D32. Each source of the transistors M31 and M32 is connected to the common voltage.

Also, one ends of the primary windings L41 and L42 are connected to the power supply VP0, and the other ends of the primary windings L41 and L42 is connected to the drains of transistors M41 and M42 via the diodes D31 and D32, respectively. These connection relationships are the same as a circuit group including the power supply VP1, the primary windings L31 and L32, the diodes D31 and D32, and the transistors M31 and M32.

When any one of the transistors M31, M32, M41, and M42 is ON, a current flows into any one of the primary windings L31, L32, L41, and L42 to generate magnetic energy. In this case, different voltage values are applied to each of the primary windings L31, L32, L41, and L42, and their winding directions are also different from each other. Therefore, it is possible to select voltage values and polarities corresponding to the respective primary windings by supplying a current to any one of the primary windings, thereafter, a voltage is induced, based on the selected voltage value and the polarity, to the secondary winding L5.

Here, refer to FIG. 4. As shown in the graph G12, in the case of the conventional transmission circuit (that is, the case that the both ends of the primary winding LP1 are unconnected to the common voltage), the voltage of the secondary winding is not retuned to 0 level (bias point) until the magnetic energy generated in the primary wingding LP1 is consumed by resistance within the circuit. Thereby, counter electromotive force is continuously induced in the secondary winding, and a signal accompanied by the counter electromotive force is continuously generated from the secondary winding. It is therefore takes about 1.3 [μsec] after the switching is performed for the voltage induced in the secondary winding LS1 to be less than the limiter voltage of 0.7 [V]. That is, during this time, the voltage induced in the secondary winding LS1 is applied to the connecting point P21, since the voltage induced in the secondary winding LS1 passes through the diodes D21 a D22. In this way, a superposed signal in which a signal from the secondary winding LS1 is superposed on a signal from the ultrasound traducer C10 is input to the amplifier circuit 12.

A dynamic range, so as to adjust to an input range of the signal from the ultrasound transducer C10, is set for the amplifier circuit 12. An input range (amplitude) of the signal form the secondary winding LS1 is higher than the input range of the signal from the ultrasound transducer C10. There is therefore a possibility of failure when the amplifier circuit receives the signals from the secondary winding LS1. That is, it is difficult for the amplifier circuit 12 to receive these signals during that the signal from the secondary winding LS1 flows into the amplifier circuit 12 by passing through the diodes D21 and D22. Hence, as described above, the limiter is arranged in input stage of the amplifier circuit 12.

During the time when the voltage induced in the secondary winding LS1 passes through the diodes D21 and D22, that is, during the time until the voltage induced in the secondary winding LS1 is less than 0.7 [V], the signal (0.7 [V] or more) from the secondary winding LS1 is superposed on the signal from the ultrasound transducer C10. Therefore, even when the signal from the ultrasound traducer C10 is a signal of less than 0.7 [V], since the signal from the secondary winding LS1 is superposed thereon, the superposed signal becomes of 0.7 [V] or more, and the limiter arranged in the input stage of the amplifier circuit 12 restricts the signal from passing thereto. Therefore, as long as the restriction caused by superposing signals is put, it is not allowed for the amplifier circuit 12 to receive any signals from the ultrasound traducer C10.

That is, in the case of switching from transmission to reception of the ultrasound waves, the reception of the ultrasound waves can not be started until the voltage induced in the secondary winding LS1 at the time of transmitting the ultrasound waves becomes the value which can be interrupted at the diodes D21 and D22. Therefore, the longer this takes, the more difficult it process an echo signal received at an earlier timing (echo signal reflected by the shallow part of the subject) at the receiving circuit side.

In general, the time until that the ultrasound wave generated from ultrasound transducer C10 is gone and returned between the ultrasound transducer C10 and the surface of the ultrasound probe (acoustic distance) is, depending on the probes, generally about 1 [μsec]. That is, the ultrasound wave to be received after this time (1 [μsec]) become a reflected wave reflected by the subject. It is therefore desirable for the voltage induced in the secondary winding LS1 to be lower than the limiter voltage 0.7 [V] of the limiter arranged in the input stage of the amplifier circuit, within this time.

On the contrary, the ultrasound diagnosis apparatus according to the present embodiment cause to connect the both ends of the primary winding LP1 to the common voltage when the voltage applied to the primary winding LP1 is OFF, as shown in FIG. 3C. Such the operation makes the potential difference between the both ends of the primary winding LP1 be 0 (the applied voltage to the primary winding LP1 becomes 0), and no current flows from the outside into the primary winding LP1. Therefore, no magnetic energy is generated in the primary winding LP1. It leads that the voltage induced in the secondary winding LS1 becomes less than the limiter voltage of 0.7 [V] after about 0.6 [μsec] from the switching, as shown by the graph G11 in FIG. 4. That is, the output amplitude from the secondary winding LS1 becomes 0 at timing earlier than the case that the conventional apparatus is used. It is therefore possible to process the echo signal received at timing earlier compared to the case when the both ends of the primary winding LP1 are unconnected to the common voltage.

As described above, in the ultrasound diagnosis apparatus according to the present embodiment, when a first voltage applied to the primary winding LP1 is OFF, the both ends of the primary winding LP1 are connected to the common voltage, to make the potential difference therebetween be 0, and the generation of the magnetic energy in the primary winding LP1 is positively controlled. It makes it possible for the second voltage induced in the secondary winding LS1 to be 0 without delay, compared to the case when the both ends of the primary winding LP1 are unconnected to the common voltage.

Further, the transmission circuit 10 according to the present embodiment is configured such that the P-type MOSFET and the N-type MOSFET are used as a pair, even in the case the voltage is applied in any direction of the primary winding LP1 (that is, both cases at the timings T11 and T12). In general, parts having physically different configuration such as the P-type MOSFET and the N-type MOSFET also have different characteristics. It is therefore difficult to provide parts having the same characteristics such as for both the P-type MOSFET and the N-type MOSFET. On the other hand, it is easier to provide parts having the same characteristics for the P-type MOSFETs or the N-type MOSFETs, having the same configurations, than for ones having different configurations from each other. Since, in the transmission circuit 10 according the present embodiment, the P-type MOSFET and the N-type MOSFET are used as a pair at both timings T11 and T12, the configurations of the circuits at each timing are the same. Therefore, even when the voltage applied to the primary winding LP1 is switched, it is possible to suppress the characteristic differences due to the configurational differences, and easily induce output pulses having symmetric positive/negative amplitude to the primary winding LP1.

In the above description, the transistors M11 to M14 are used as the switches, but it is not limited to this configuration as long as the configuration fulfills the functions of a switch having a desired changeover velocity. Instead of the transistors M11 to M14 (MOS FET), a MEMS (Micro Electro Mechanical Systems) switch may be used, for example. Further, the MOSFET used in this case is not basically limited, and may be either of a depression type or an enhancement type. It is however preferable the enhancement type in which no drain current flows when no gate voltage is applied. Furthermore, the transistor used in the present embodiment and the following embodiment is not limited to an insulated gate-type MOSFET, and may be a junction-type J-FET. Also, for example, this transistor may be a bipolar transistor. When the bipolar transistor is used, the transmission circuit 10 according to the present embodiment comprises a PNP transistor instead of the P-type MOSFET, and a NPN transistor instead of the N-type MOSFET. In addition, the gate, drain, and source are replaced by a base, emitter, and collector, respectively, and comprised by the transmission circuit 10. The timing to turn ON the bipolar transistor is configured so that a driving current flows into the base at the timing when the above described pulses are input. For such the bipolar transistor, one having a large hybrid forward emitter (hereinafter, it refers to hFE) value is used in terms of making the driving current flowing into the base small. Otherwise, it is preferable to use one having a configuration such that Darlington connection is performed to a plurality of transistors in order to make the value of hFE large.

Further, in a case that pulses having symmetric positive/negative amplitude are output from the secondary winding, the power sources VP11 and VP13 may be configured with the same power source. In such the configuration, it makes is possible to simplify the configuration of the transmission circuit 10.

The transmission circuit 10 according to the present embodiment may comprise the transistors of the same type (such as P-type, N-type, PNP-type, NPN-type) for all, for example. To be more specific, for example, by causing the transistor M11 and the transistor M13 to be the N-type MOSFETs, the transmission circuit 10 is configured by the transistors of the N-type MOSFETs only. Thereby, the transistor M11 and the transistor M13 are operated as a source follower type switch circuit in which a signal is taken out form the source side. Here, in order to drive the transistor M11, a driving signal to be applied to the gate of the transistor M11 becomes a signal in which the voltage VP111 is added to a driving signal to be applied to the transistor M14. Also, in order to drive the transistor M13, similarly, a driving signal to be applied to the transistor M13 becomes a signal in which the voltage VP131 is added to a driving signal to be applied to the transistor M12. In this way, it is preferable to select the MOSFET having a high withstand voltage between the gate and the source of the transistor, since a large voltage over 30V, for example, is applied therebetween. The MOSFET includes, for example, a GaN-MOSFET, a SiC-MOSFET, and the like, other than the Si-MOSFET. Also, since the transmission circuit 10 is configured with the transistors of the same type for all, for example, a switching element which has no type distinction between IGBT, GTO, and the like, may be used as a transistor. In a case that GTO is used as the transistor which configures the transmission circuit 10, for example, the drain and the source, when the transmission circuit 10 is configured of the N-type MOSFET for all, are replaced with the cathode and the anode, respectively. These may be applied similarly in the following embodiment.

The transmission circuit 10 may also be used as a single power supply. This power supply is a power supply for the ultrasound diagnosis apparatus to be connected to at least an ultrasound probe, for example. This power supply is driven by the transformer K3 comprising the primary winding LP1 and the secondary winding LS1, the first power source VP11 and the second power source VP13 which are connected to the primary winding LP1, and the voltage induced to the secondary LS1. This power supply comprises a driving part which drives so that the induced voltage is changed among the first level voltage based on the first power source VP11, the second level voltage based on the second power source VP13, and the third level voltage between the first level voltage and the second level voltage. This power supply may be configured by appropriately selecting, for example, from what described above about the transmission circuit 10.

(Receiving Circuit)

Next, operations of a receiving circuit, that is, the amplifier circuit 12, the delay circuit 13, the adding circuit 14, the signal processor 15, and the image processor 16 are described as reference to FIG. 1. The amplifier circuit 12 receives ultrasound echo signals received from each transducer of the ultrasound transducer group 11 via a signal line connected to each of the transducers. The amplifier circuit 12 implements processing such as low noise implication, buffering, or the like to finely transmit the ultrasound echo signals received from each of the transducers.

The signal amplified by the amplifier circuit 12 is provided with delay time by the delay circuit 13, added by the adding circuit 14, and output to the signal processor 15. The signal phased and added by the delay circuit 13 and the adding circuit 14, respectively, is detected by the signal processor 15 to extract an envelope. The extracted envelope is displayed on the display 17 after coordinate transformation in accordance with a section of the observation target by the image processor 16 and gradation process suitable for image display are performed. Thereby, the form information of the inside of the observation target is displayed on the display 17 in real time.

As described above, the ultrasound diagnosis apparatus according to the present embodiment positively suppresses the generation of the magnetic energy in the primary winding LP1 by connecting the both ends of the primary winding LP1 to the common voltage to make the potential difference between the both ends thereof be 0, when the first voltage applied to the primary winding LP1 becomes OFF. Thereby, it is possible for the second voltage induced in the secondary winding LS1 to be 0 without delay compared to the case that the both ends of the primary winding LP1 are unconnected to the common voltage. It is therefore possible to start the reception promptly after transmitting ultrasound waves, and, for example, to generate an image based on the ultrasound waves reflected by a shallow part of the subject. Further, in the ultrasound diagnosis apparatus according to the present embodiment, it is the same configuration for the circuit connected to the primary winding LP1 for a case when pulses of the positive electrode side are output and for a case when pulses of the negative electrode side are output. It makes it possible to reduce variation in performance based on the differences in the configurations of each element.

Second Embodiment

Figure 5A:
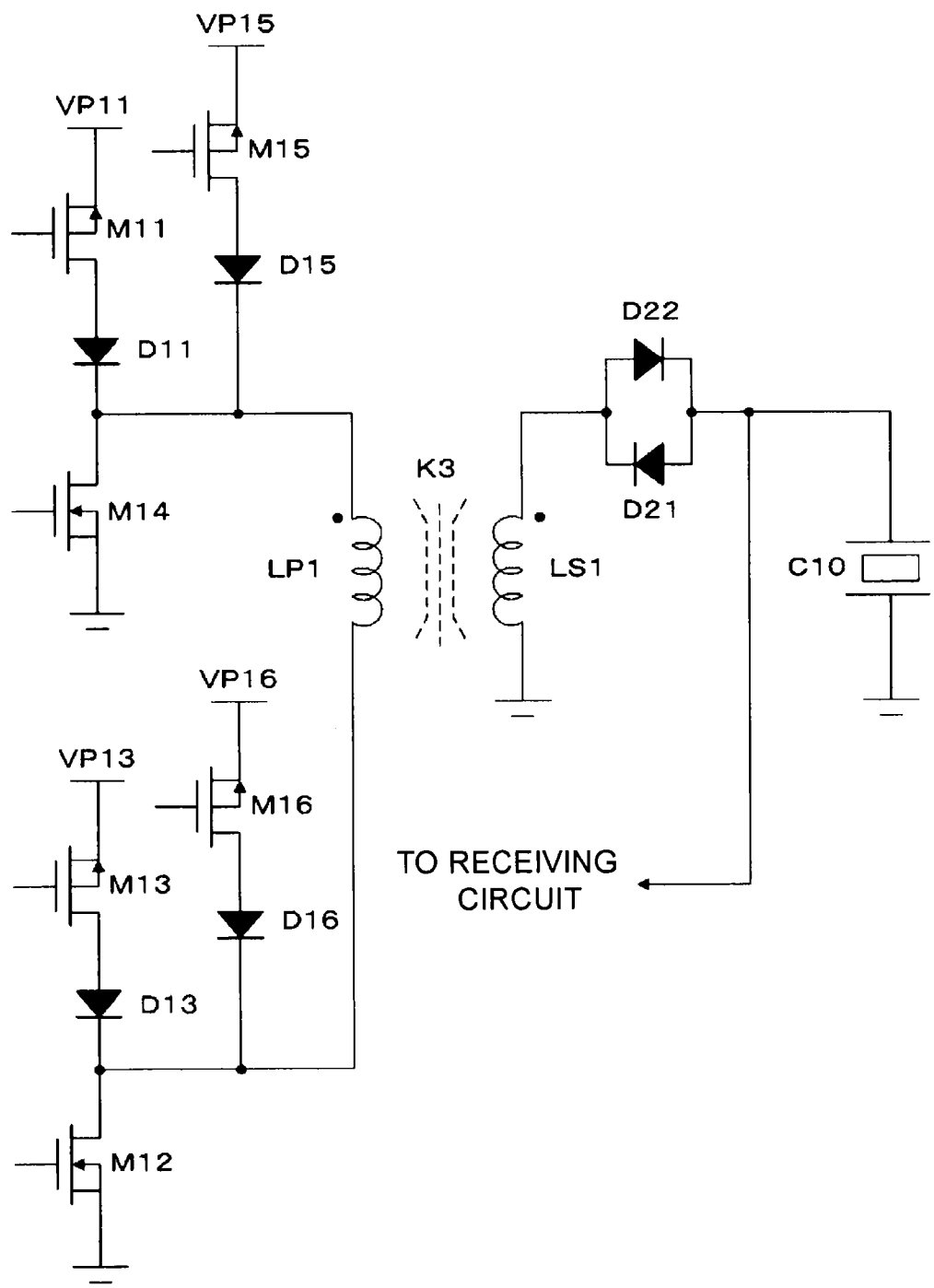
FIG. 5A It is a circuit diagram illustrating an example of a transmission circuit according to a second embodiment.

Next, an ultrasound diagnosis apparatus according to a second embodiment will be described. The ultrasound diagnosis apparatus according to the present embodiment operates while switching different modes, such as B-mode and C-mode, in time division manner. For example, B-mode is a mode to display two dimensional form images. In B-mode, one ultrasound transducer implements both transmission and reception of ultrasound waves in time division manner, and an ultrasound wave having large amplitude and a low (small) wave number is used. C-mode is a mode to analyze blood flow distribution by applying the Doppler Effect to display a two dimensional blood flow image in color. In this mode, an ultrasound wave having small amplitude and a high (large) wave number is used. In this way, these modes have amplitude and wave number of the ultrasound waves different from each other, and voltages caused to induce in the secondary winding LS1 in accordance with the mode are different. The ultrasound diagnosis apparatus according to the present embodiment also intentionally changes the waveform of the transmitting pulse by changing the voltage applying to the ultrasound transducers during the transmission of the ultrasound waves. In order to realize such operations, the transmission circuit 10 according to the present embodiment applies voltages of different kinds, while switching in time division manner, to the primary winding LP1. Hereinafter, it will be described the ultrasound diagnosis apparatus according to the present embodiment will be described focusing attention to a configuration of the transmission circuit 10 which is different from that of the first embodiment, and control by the driving part 100, as reference to FIG. 5A. FIG. 5A is a circuit diagram showing an example of the transmission circuit according to the present embodiment.

Figure 2B:
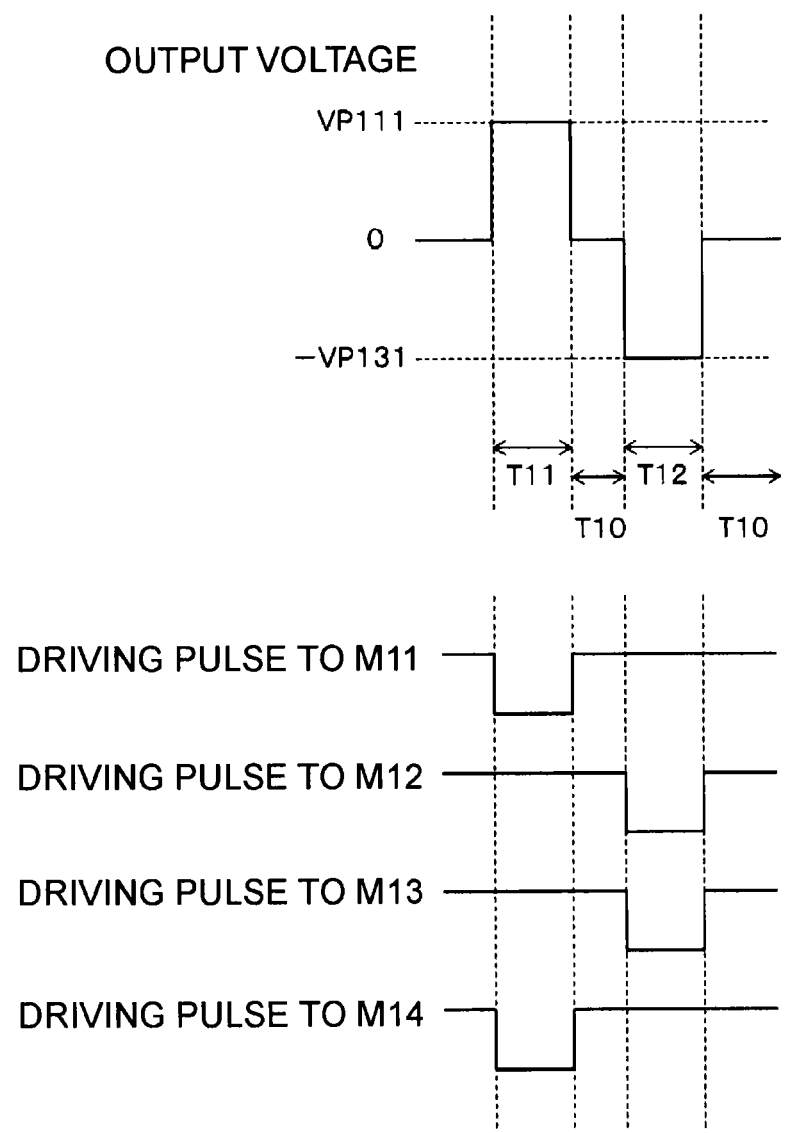
FIG. 2B It is schematic diagrams illustrating relationships between pulses to each transistor and output waveforms from a secondary winding in the first embodiment.
Figure 2C:
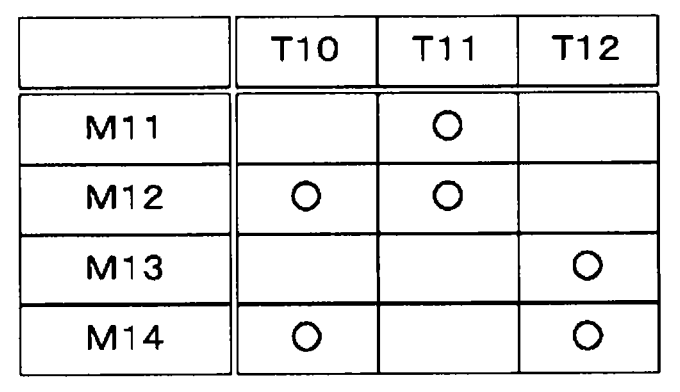
Figure 3A:
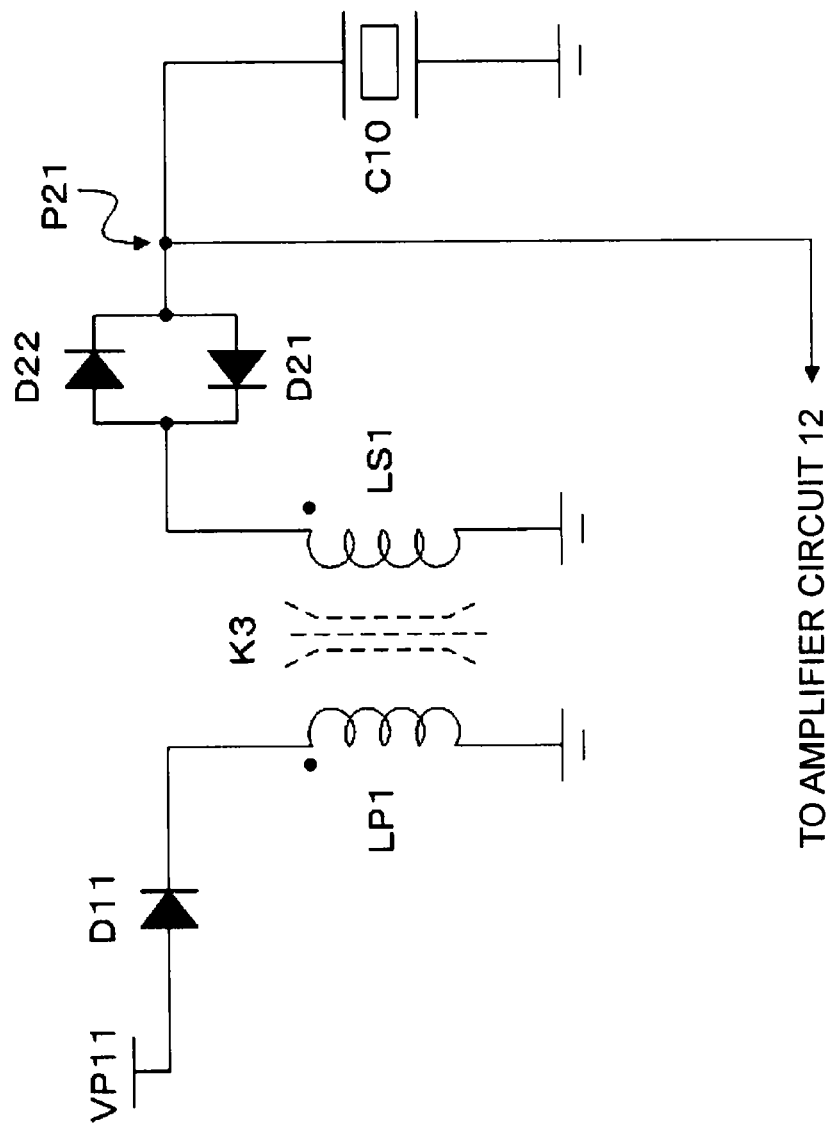
FIG. 3A It is a circuit diagram illustrating an equivalent circuit at a predetermined timing in the first embodiment.
Figure 3B:
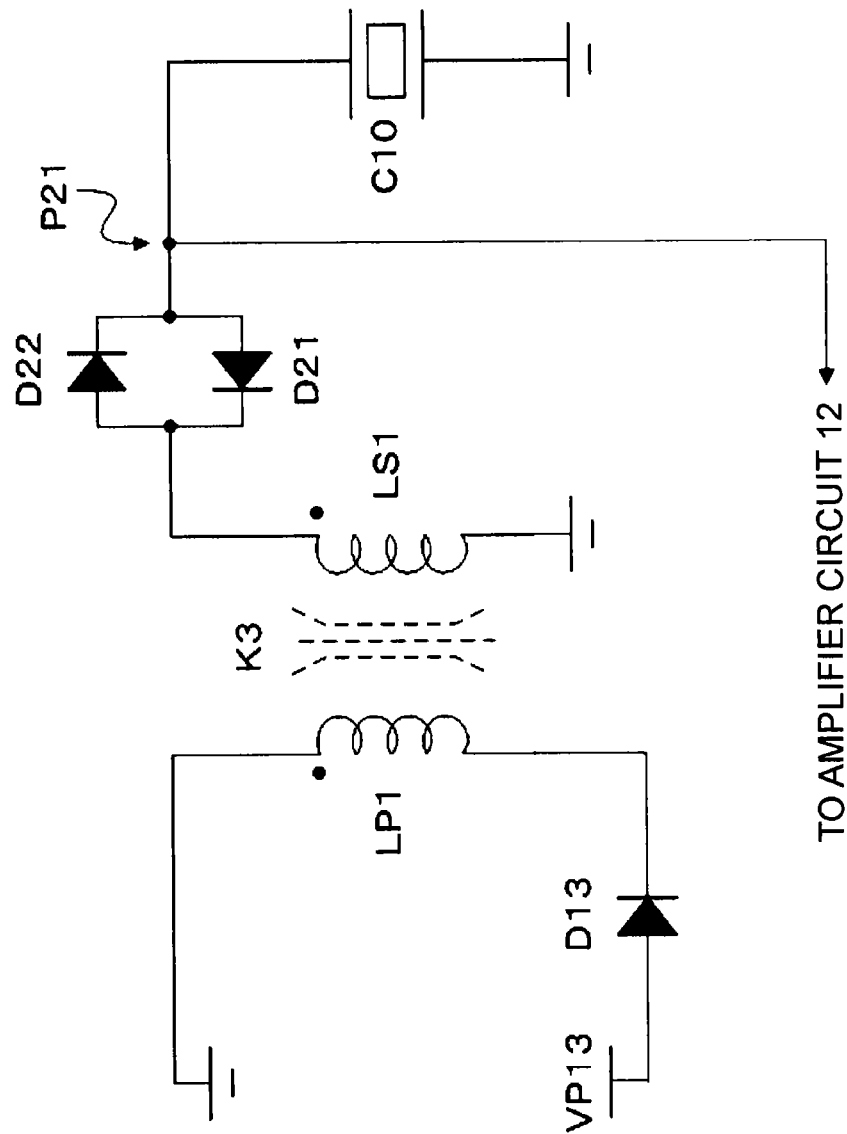
FIG. 3B It is a circuit diagram illustrating an equivalent circuit at a predetermined timing in the first embodiment.

As shown in FIG. 5A, the transmission circuit 10 according to the present embodiment comprises power sources VP15 and VP16, transistors M15 and M16, and diodes D15 and D16, in addition to the configuration shown in FIG. 2A. The transistors M15 and M16 have the same configuration as the transistors M11 and M13, that is, as the P-type MOSFET. The power source VP15 corresponds to a "third power source", and the power source VP16 corresponds to a "fourth power source".

The source of the transistor M15 is connected to the power source VP15, and the source of the transistor M16 is connected to the power source VP16. The drain of the transistor M15 is connected to one end of the primary winding LP1, in the same way as the transistor M11. Further, the drain of the transistor M16 is connected to the other end of the primary winding LP1, in the same way as the transistor M13. The diode D15 in interposed between the one end of the primary winding LP1 and the drain of the transistor M15 to regulate the current flow in the direction from the primary winding LP1 to the transistor M11. Similarly, the diode D16 is interposed between the other end of the primary winding LP1 and the drain of the transistor M16 to regulate the current flow in the direction from the primary winding LP1 to the transistor M16. Further, the transmission circuit 10 of the present embodiment is also configured with the same type of elements in the same way as the first embodiment described above. In such the case, for example, the transistors M11, M15, M13 and M16 may be the N-type MOSFETs.

Figure 5B:
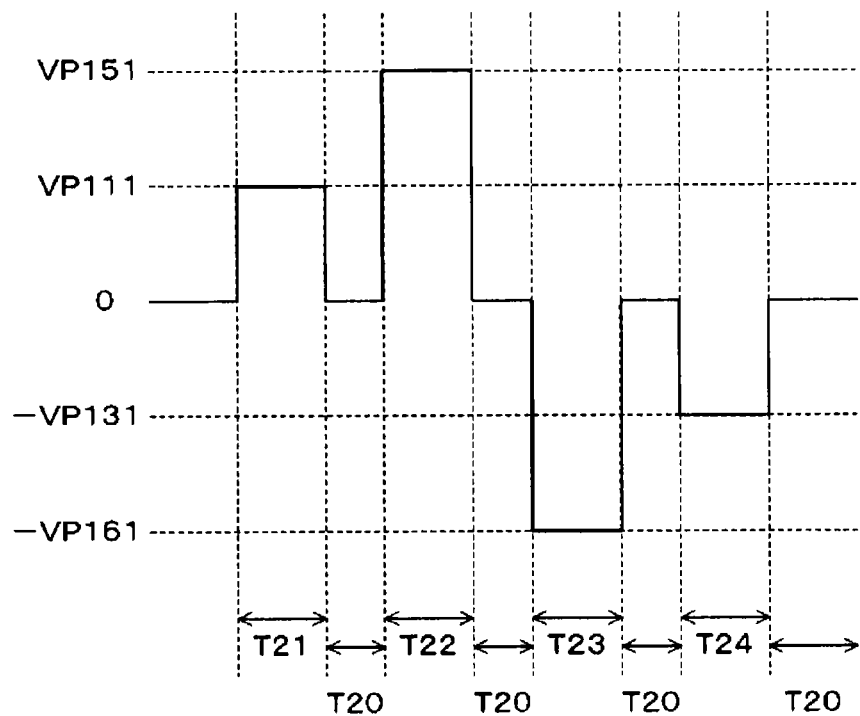
FIG. 5B It is a schematic diagram illustrating relationships between pulses to each transistor and output waveforms from a secondary wingding in the second embodiment.
Figure 5C:
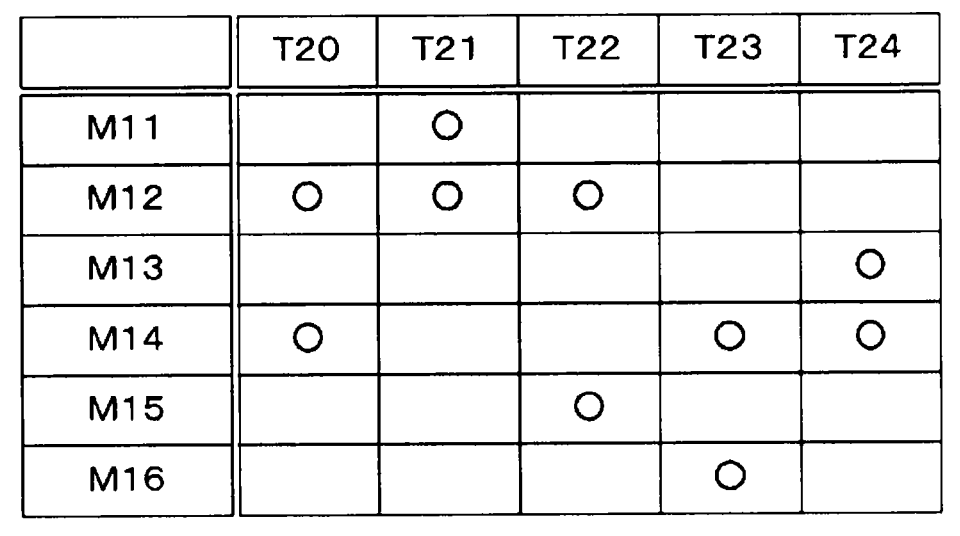

The driving part 100 switches ON/OFF of each of the transistors M11 to M16 at predetermined timings, and thereby, controlling the kinds and directions of the voltages (primary voltage) applied to the primary winding LP1. The control of this driving part 100 will be described as reference to FIG. 5B and FIG. 5C. FIG. 5B is a schematic view illustrating relationships between pulses to each of the transistors M11 to M16 and output waveforms from the secondary wingding LS1. T20, T21, T22, T23 and T24 in FIG. 5B show each of the timings during a period for transmitting the ultrasound waves, and the voltages (secondary voltage) induced in the secondary winding LS1 are switched for each of the timings. Further, VP111, VP131, VP151, and VP161 in FIG. 5B show the secondary voltages induced in the secondary side of the transformer K3 (that is, secondary winding LS1) by the switching of the transistors M11 to M16. The voltage VP111 in FIG. 5B corresponds to the power source VP11, and the voltage VP131 corresponds to the power source VP13. Further, the voltage VP151 corresponds to the power source VP15, and the voltage VP161 corresponds to the power source VP16. In addition, FIG. 5C is a diagram illustrating each of ON/OFF states of the transistors M11 to M16 at the timings T20, T21, T22, T 23 and T24 shown in FIG. 5B. In FIG. 5C, the part shown by "○" indicates the "ON" state.

As shown in FIG. 5B, at timing T21, the driving part 100 supplies pulses to the transistors M11, M12, M13 and M16. Thereby, as shown in FIG. 5C, the transistors M11 and M12 become ON, and the transistors M13 to M16 become OFF. The equivalent circuit in this case is shown in FIG. 6A. As shown in FIG. 6A, the primary voltage of the power supply VP11 is applied to the primary winding. Thereby, as shown in FIG. 5B, the secondary voltage of the VP111 (positive electrode) is induced in the secondary winding LS1, and the induced voltage is applied to the ultrasound transducer C10.

Figure 6B:
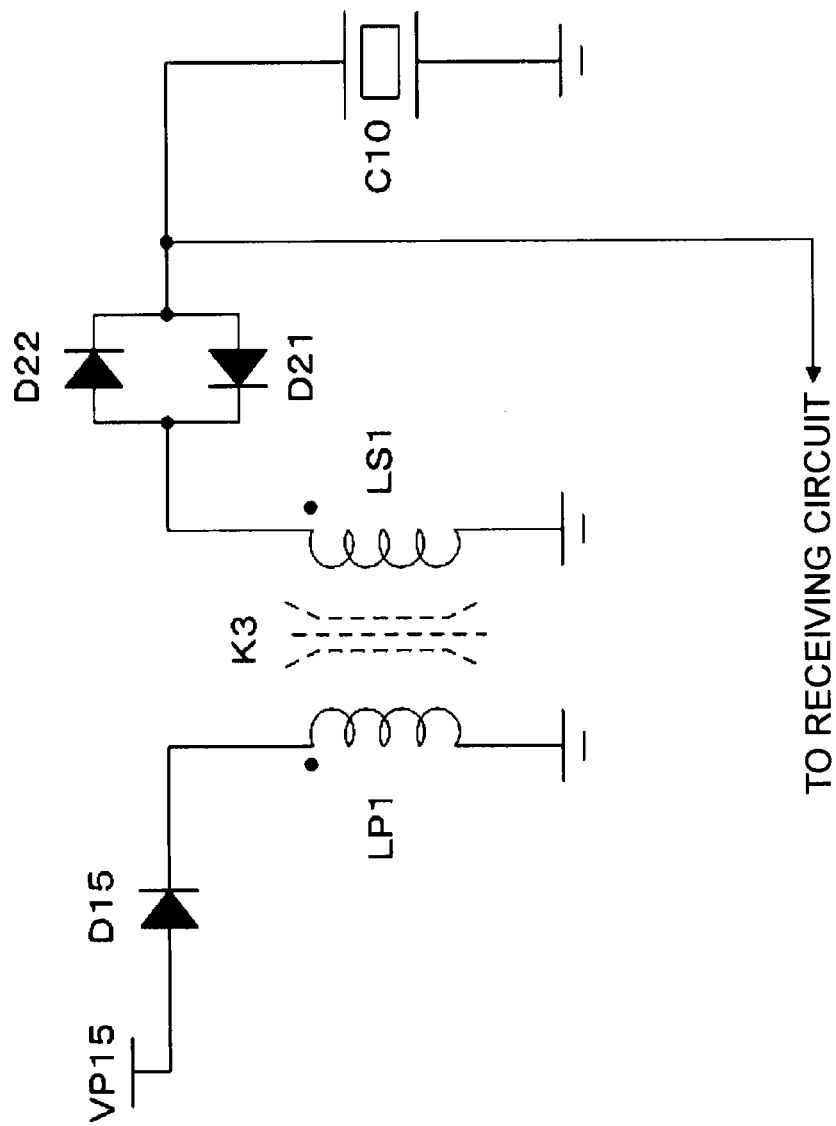
FIG. 6B It is a circuit diagram illustrating an equivalent circuit at a predetermined timing in the second embodiment.

Further, as shown in FIG. 5B, at the timing T22, the driving part 100 supplies pulses to the transistors M12, M13, M15 and M16. Thereby, as shown in FIG. 5C, the transistors M12 and M15 are ON, and the transistors M11, M13, M14, and M16 are OFF. The equivalent circuit in this case is shown in FIG. 6B. As shown in FIG. 6B, at the timing T22, the primary voltage of the power supply VP15 is applied to the primary winding LP1. Thereby, as shown in FIG. 5B, the secondary voltage of the VP151 (positive electrode) is induced in the secondary winding LS1, and the induced voltage is applied to the ultrasound transducer C10.

Figure 6C:
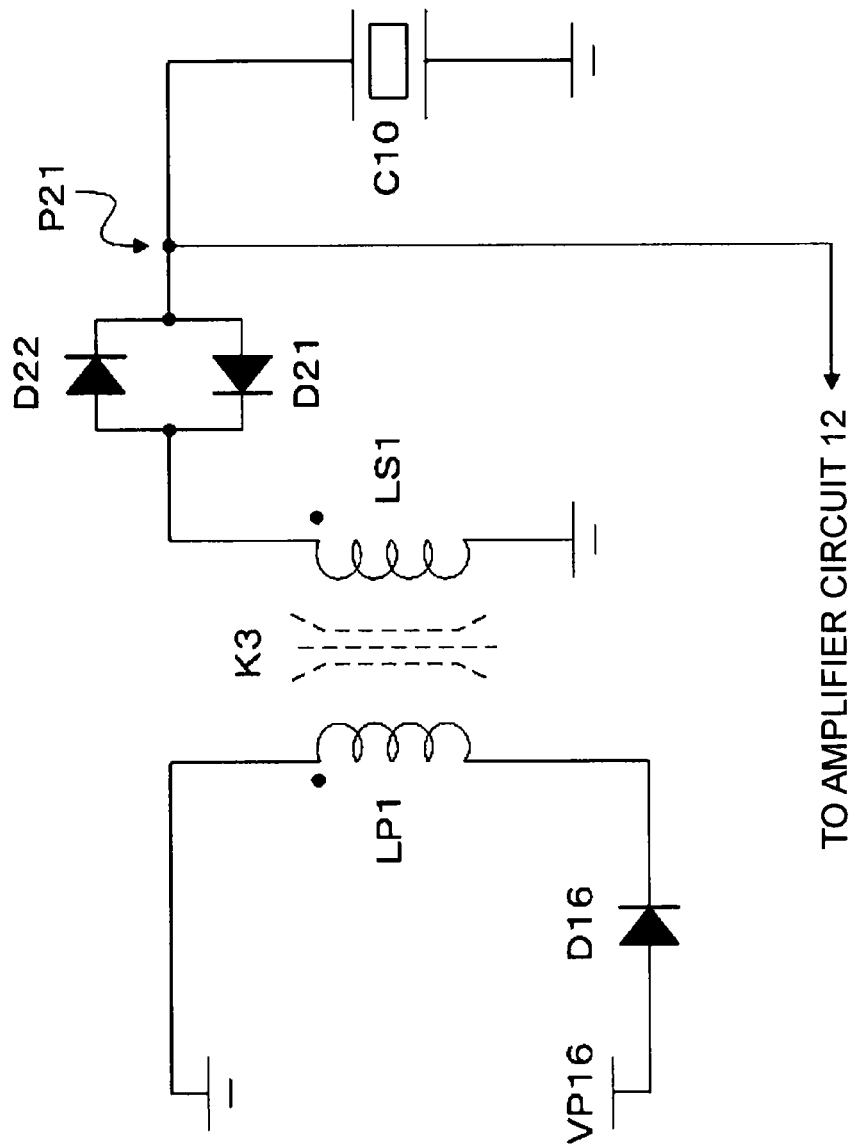
FIG. 6C It is a circuit diagram illustrating an equivalent circuit at a predetermined timing in the second embodiment.

Further, as shown in FIG. 5B, at the timing T23, the driving part 100 supplies pulses to the transistors M11, and M14 to M16. Thereby, as shown in FIG. 5C, the transistors M14 and M16 become ON, and the transistors M11 to M13, and M15 become OFF. The equivalent circuit in this case is shown in FIG. 6C. As shown in FIG. 6C, at the timing T23, the primary voltage of the power supply VP16 is applied to the primary winding LP1. At this time, the direction of the current flowing into the primary winding LP1 is opposite of the cases at the timings T21 and T22 shown in FIGS. 6A and 6B. Therefore, as shown in FIG. 5B, the secondary voltage of the VP161 (negative electrode) is induced in the secondary winding LS1, and the induced voltage is applied to the ultrasound transducer C10.

Figure 6D:
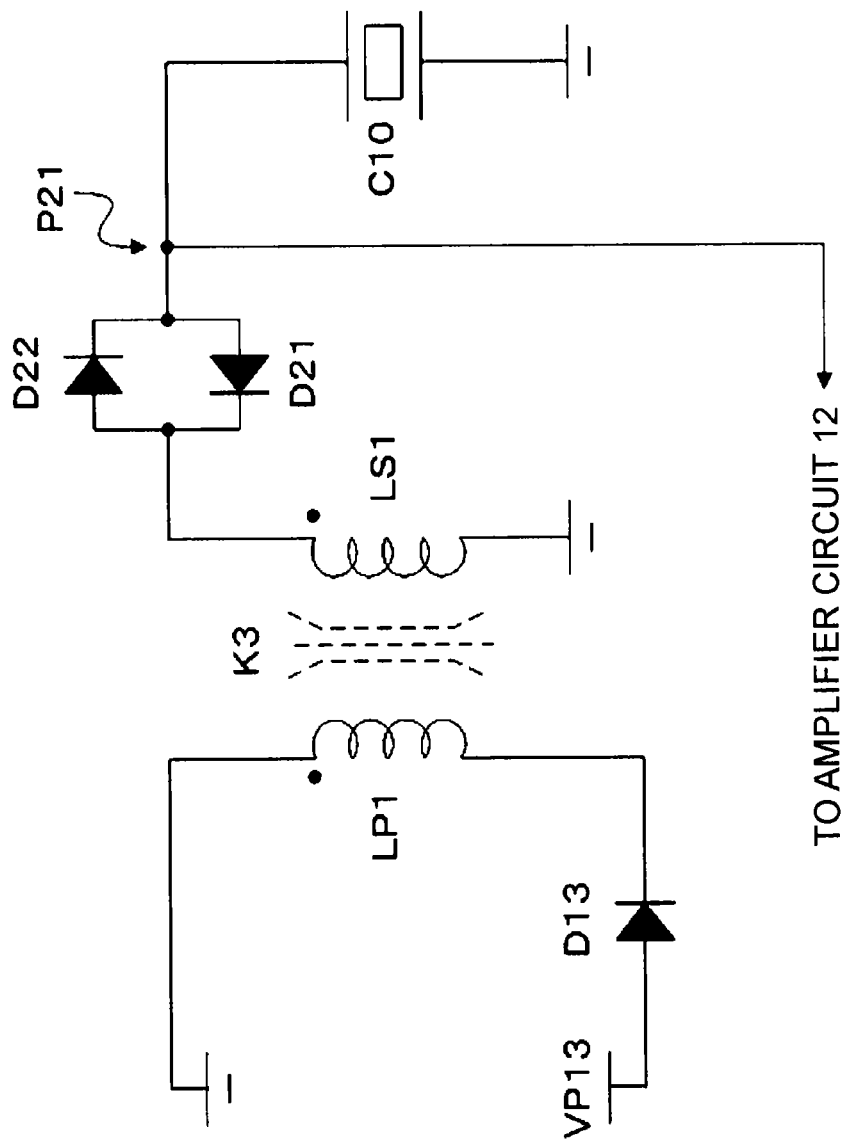
FIG. 6D It is a circuit diagram illustrating an equivalent circuit at a predetermined timing in the second embodiment.

Further, as shown in FIG. 5B, at the timing T24, the driving part 100 supplies pulses to the transistors M11, and M13 to M15. Thereby, as shown in FIG. 5C, the transistors M13 and M14 become ON, and the transistors M11, M12, M15 and M16 become OFF. The equivalent circuit in this case is shown in FIG. 6D. As shown in FIG. 6D, at the timing T24, the primary voltage of the power supply VP13 is applied to the primary winding LP1. At this time, the direction of the current flowing into the primary winding LP1 is opposite of the cases at the timings T21 and T22 shown in FIGS. 6A and 6B. Therefore, as shown in FIG. 5B, the secondary voltage of the VP131 (negative electrode) is induced in the secondary winding LS1, and the induced voltage is applied to the ultrasound transducer C10.

Figure 6E:
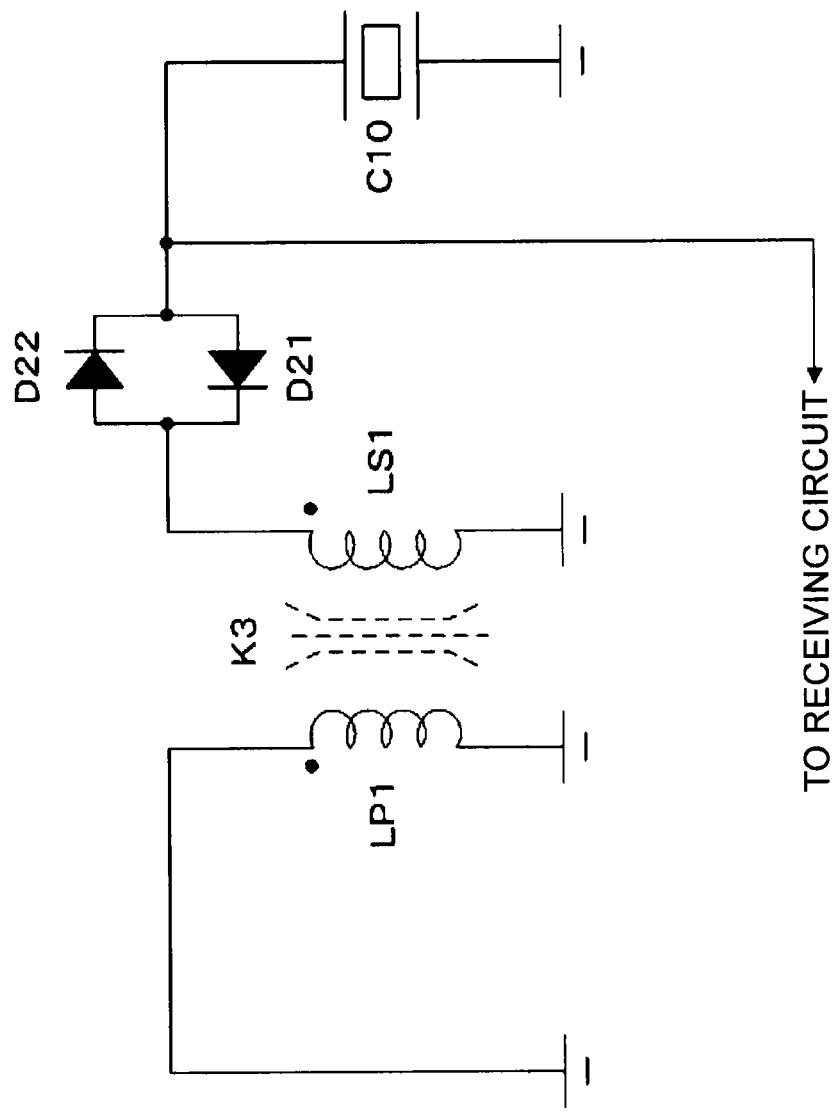
FIG. 6E It is a circuit diagram illustrating an equivalent circuit at a predetermined timing in the second embodiment.

Furthermore, as shown in FIG. 5B, at the timing T20, the driving part 100 supplies pulses to the transistors M11 to M16. Thereby, as shown in FIG. 5C, the transistors M12 and M14 become ON, and the transistors M11, M13, M15 and M16 become OFF. The equivalent circuit in this case is shown in FIG. 6E. As shown in FIG. 6E, at the timing T20, the both ends of the primary winding LP1 are connected to the common voltage. That is, the voltage difference between the both ends of the primary winding LP1 becomes 0, and the generation of the counter electromotive voltage in the primary winding LP1 is suppressed. Thereby, as shown in FIG. 5B, the voltage of the secondary winding LS1, that is, the voltage to the ultrasound transducer C10 becomes 0.

As described above, in the ultrasound diagnosis apparatus according to the present embodiment, one circuit group and other circuit group, which have the same configuration and different voltages of the connected power supplies, are connected in parallel to the primary winding LP1. Specifically, the one circuit group is a circuit group comprising the power supplies VP11 and VP13, and the transistors M11 and M13. The other circuit group is a circuit group comprising the power supplies VP15 and VP16, and the transistors M15 and M16. In such the configuration, interaction effects which are the same as the ultrasound diagnosis apparatus according to the first embodiment can be obtained, and further, the voltage of a plurality of different levels (more than three) can be applied to the ultrasound transducer C10 while appropriately switching the voltage.

Figure 7:
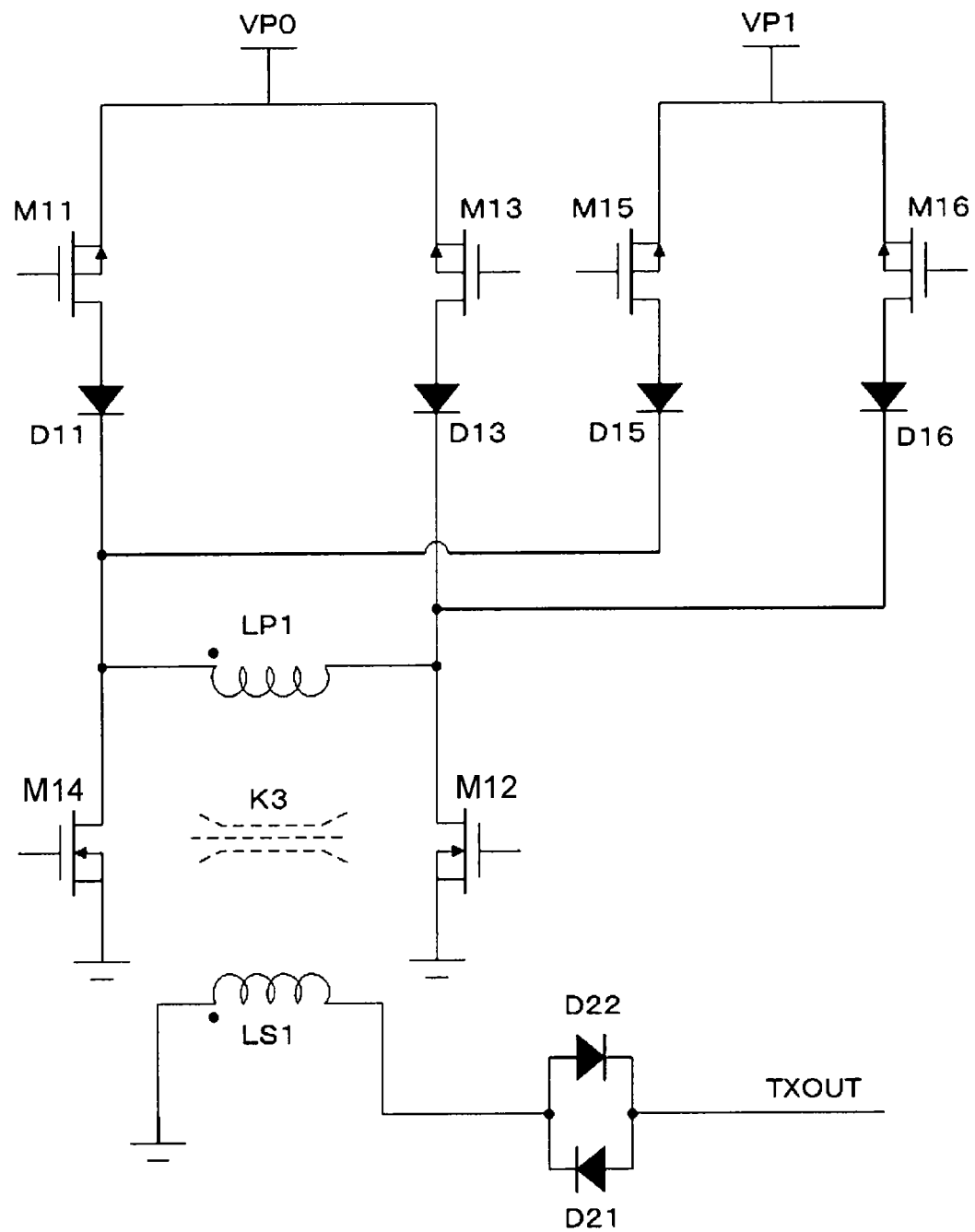
FIG. 7 It is a circuit diagram illustrating a mode for the transmission circuit according to the second embodiment.

In the case that pulses having symmetric positive/negative amplitude are output from the secondary winding, the power sources VP11 and VP13 may be configured with the same power source VP0, and similarly, the power sources VP15 and VP16 may be configured with the same power source VP1. The circuit diagram of the transmission circuit 10 showing such the example is shown in FIG. 7. In such the configuration, the voltages VP111, VP131, VP151, and VP161 shown in FIG. 5B satisfy the following relationships VP111=VP131=VP0, and VP151=VP161=VP1. That is, the pulses output from a secondary winding LS1 (induced voltages) at the timings T22 and T23 become symmetric based on 0. Similarly, the pulses output from the secondary winding LS1 at the timings T21 and T24 become symmetric based on 0.

Further, in the above example, the pulses having different levels are induced in the secondary winding LS1 by adjusting the voltages of the power sources VP11, VP13, VP15, and VP16, however, it may be configured such that the pulses having different levels are output by adjusting the number of the primary winding connected to the transformer K3. A circuit diagram of the transmission circuit 10 showing such the example is shown in FIG. 8. In FIG. 8, primary windings LP11 and LP12 are arranged on the primary side of the transformer K3 so that those windings are connected in parallel to the secondary winding LS1. A circuit group comprising the power source VP11, the transistor M11, and the diode D11 is connected to one end of the primary winding LP11, and a circuit group comprising the power source VP13, the transistor M13, and the diode D13 is connected to the other end thereof. Also, the both ends of the primary winding LP11 are connected to the common voltage, via the transistors M12 and M14, respectively.

Similarly, a circuit group comprising the power source VP15, the transistor M15, and the diode D15 is connected to one end of the primary winding LP12, and a circuit group comprising the power source VP16, the transistor M16, and the diode D16 is connected to the other end thereof. Also, the both ends of the primary winding LP12 are connected to the common voltage, via transistors M12' and M14', respectively.

In such the configuration, it is possible to adjust the voltage induced in the secondary winding LS1 by adjusting the voltages of the power sources VP11, VP13, VP15, and VP16, and the number of the primary windings LP11 and LP12.

Figure 9B:
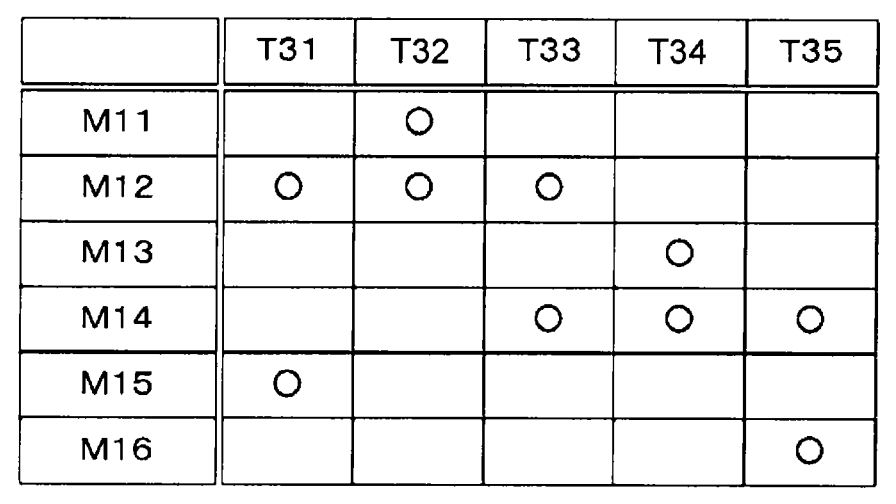

Further, according to the ultrasound diagnosis apparatus of the present embodiment, as shown in FIG. 9A, it is possible to change the voltage to be applied to the ultrasound transducer C10. FIG. 9A is schematic diagram illustrating an example of relationships between pulses to each of the transistors M11 to M16 and output waveforms from the secondary winding LS1. T31, T32, T33, T34, and T35 in FIG. 9A show each of the timings during a period for transmitting the ultrasound waves, and the voltage (secondary voltage) induced from the secondary winding LS1 is switched at each of the timings. VP111, VP131, VP151, and VP161 in FIG. 9A correspond to VP111, VP131, VP151, and VP161 in FIG. 5B, respectively. In addition, FIG. 9B illustrates an ON/OFF state of each of the transistors M11 to M16 at the timings T31, T32, T33, T34, and T35 shown in FIG. 9A. In FIG. 9B, the part shown by "○" indicates the "ON" state.

As shown in FIG. 9A, at the timing T31, the driving part 100 supplies pulses to the transistors M12, M13, M15, and M16. Thereby, as shown in FIG. 9B, the transistors M12 and M15 become ON, and transistors M11, M13, M14, and M16 become OFF. That is, at the timing T31, the primary voltage of the power source VP15 is applied to the primary winding LP1. Thereby, as shown in FIG. 9A, the secondary voltage of the VP151 (positive electrode) is induced in the secondary winding LS1, and the induced voltage is applied to the ultrasound transducer C10.

Further, as shown in FIG. 9A, at the timing T32, the driving part 100 supplies pulses to the transistors M11, M12, M13, and M16. Thereby, as shown in FIG. 9B, the transistors M11 and M12 become ON, and transistors M13 to M16 become OFF. That is, at the timing T32, the primary voltage of the power source VP11 is applied to the primary winding. Thereby, as shown in FIG. 5B, the secondary voltage of the VP111 (positive electrode) is induced in the secondary winding LS1, and the induced voltage is applied to the ultrasound transducer C10.

Further, as shown in FIG. 9A, at the timing T33, the driving part 100 supplies pulses to the transistors M11 to M16. Thereby, as shown FIG. 9B, the transistors M12 and M14 become ON, and the transistors M11, M13, M15, and M16 become OFF. That is, at the timing T33, the both ends of the primary winding LP1 are connected to the common voltage. That is, the potential difference between the both ends of the primary winding LP1 becomes 0, and the generation of the counter electromotive voltage in the primary winding LP1 is suppressed. Thereby, as shown in FIG. 9A, the voltage of the secondary winding LS1, that is, the voltage to the ultrasound transducer C10 becomes 0.

Further, as shown in FIG. 9A, at the timing T34, the driving part 100 supplies pulses to the transistors M11, and M14 to M16. Thereby, as shown in FIG. 9B, the transistors M14 and M16 become ON, and the transistors M11 to M13, and M15 become OFF. That is, at the timing T34, the primary voltage of the power source VP16 is applied to the primary winding LP1. At this time, the direction of the current flowing into the primary winding LP1 is opposite of the cases at the timings T31 and T32. Therefore, as shown in FIG. 9A, the secondary voltage of the VP161 (negative electrode) is induced in the secondary winding LS1, and the induced voltage is applied to the ultrasound transducer C10.

Furthermore, as shown in FIG. 9A, at the timing T35, the driving part 100 supplies pulses to the transistors M11, and M13 to M15. Thereby, as shown in FIG. 9B, the transistors M13 and M14 become ON, and the transistors M11, M12, M15, and M16 become OFF. That is, at the timing T35, the primary voltage of the power source VP13 is applied to the primary winding LP1. At this time, the direction of the current flowing into the primary winding LP1 is opposite of the cases at the timings T31 and T32. Therefore, as shown in FIG. 9A, the secondary voltage of the VP131 (negative electrode) is induced in the secondary winding LS1, and the induced voltage is applied to the ultrasound transducer C10.

Figure 11B:
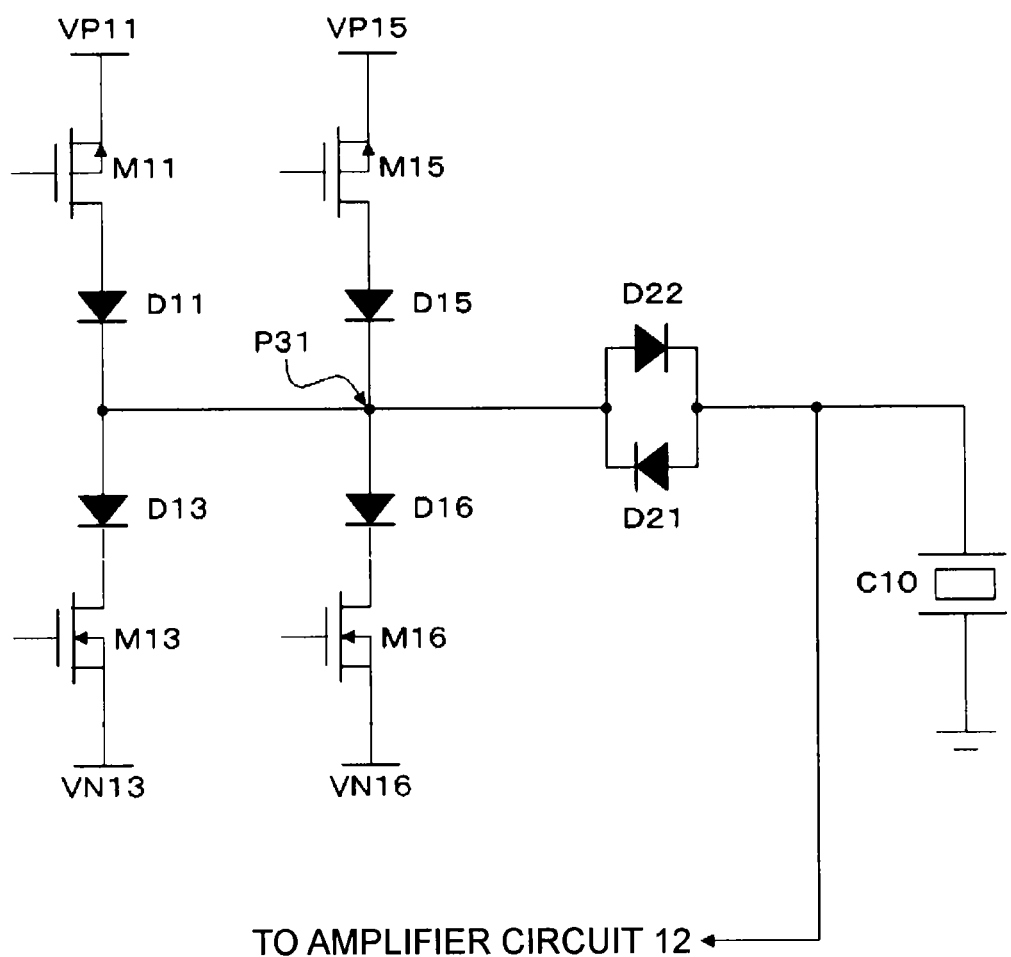
FIG. 11B It is a circuit diagram illustrating an example of a conventional transmission circuit.

Here, refer to FIG. 11B. FIG. 11B illustrates a circuit diagram a totem pole type transmission circuit used for the conventional ultrasound diagnosis apparatus. As shown in FIG. 11B, this transmission circuit comprises the power sources VP11 and VP15, negative power sources VN13, and VN16, and the transistors M11, M13, M15, and M16. The transmission circuit is connected to the transducer C10 and a receiving circuit (specifically, the amplifier circuit 12), via a diode switch comprising the diodes D21 and D22.

In the example of FIG. 11B, the power sources VP11 and the VP15 are connected to the drains of the transistors M11 and M15, respectively. Similarly, the negative power sources VN13 and VN16 are connected to the drains of the transistors M13 and M16, respectively. The sources for each of the transistors M11, M13, M15, and M16 are connected to the ultrasound transducer C10 and the receiving circuit (specifically, the amplifier circuit 12), via the diode switch. The diodes D11, D13, D15, and D16 are interposed between the diode switch and the transistors M11, M13, M15, and M16, respectively, to regulate the current flow.

In such the configuration, the transmission circuit shown in FIG. 11B applies the voltage, based on any one of the following the power sources among the power source VP11, the power source VP15, the negative power source VN13, and the negative power source VN16, to the ultrasound transducer C10, by turning any of the transistors M11, M13, M15, and 16

ON. That is, the level and the polarity of the voltage to be applied to the ultrasound transducer C10 is switched by controlling the transistors M11, M13, M15, and M16.

However, as shown by the timings from T31 to T32 in FIG. 9A, when a different level of the voltage having the same polarity is output, in the conventional transmission circuit shown in FIG. 11B, it is necessary to suck (charge) the charge from the output line indicated with P31, in order to lower the voltage from VP115 to VP111. However, since the conventional transmission circuit has no configuration for sucking this charge, so that it is difficult to change the voltage from VP115 to VP111 without delay. On the other hand, in the conventional transmission circuit shown in FIG. 11B, when the suction of this charge is to be realized, for example, in the case of the timing from T31 to T32, it requires for the power source VP15 to use such a power source which is capable of performing both suction and discharge. In the power source in general, however, a positive power source discharges, and a negative power source sucks (charges). It therefore requires a special power source in order to be capable of performing both suction and discharge, and it will be large restrictions regarding to the costs, the circuit size, and the performance thereof.

On the contrary, according to the transmission circuit of the present embodiment shown in FIG. 5A, when the timing is changed from T31 to T32, suction (charge) is performed to the common voltage via the transistor M12. For that reason, it is possible to instantly change the voltage, without using any special power supply which is capable of performing both suction (charge) and discharge.

As described above, in the ultrasound diagnosis apparatus according to the present embodiment, one circuit group and other circuit group which have the same configurations and different voltages of the connected power supplies are connected in parallel to the primary winding LP1. Specifically, in FIG. 5A, it is shown a circuit group comprising the power supplies VP11 and VP13, and the transistors M11, and M13. Also, it is shown another circuit group comprising the power supplies VP15 and VP16, and the transistors M15, and M16. In such the configuration, interaction effects which are the same as the ultrasound diagnosis apparatus according to the first embodiment can be obtained, and further, the voltage of a plurality of different levels (more than five including the case of 0 levels) can be applied to the ultrasound transducer C10 while appropriately switching the voltage.

Modified Example

Figure 10:
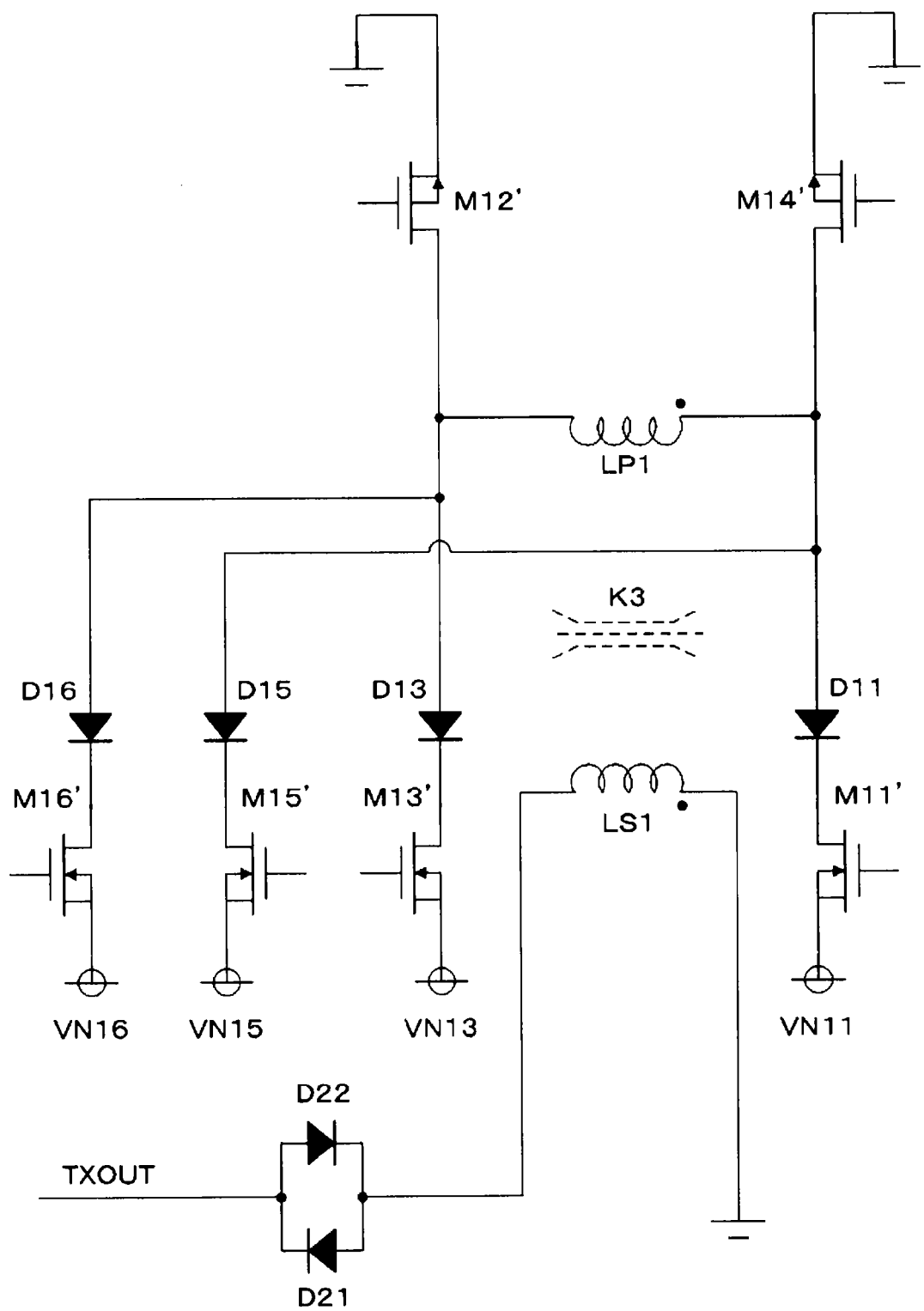
FIG. 10 It is a circuit diagram illustrating an example of a transmission circuit according to a modified example.

Next, a modified example of the ultrasound diagnosis apparatus according to the second embodiment will be described with reference to FIG. 10. FIG. 10 is an example of a circuit diagram of the transmission circuit 10 in the ultrasound diagnosis apparatus according to the modified example.

In the example shown in the second embodiment (see FIG. 5A), it is configured such that the transistor M11, M13, M15, and M16 are the P-type MOSFETs, and the transistors M12, and M14 are the N-type MOSFETs. In such the configuration, it is necessarily that the number of the transistors (the P-type MOSFETs) to be connected to the power source (that is, VP11, VP13, VP15, and VP16) exceeds the number of the transistors (the N-type MOSFETs) to be connected to the common voltage. It is, however, not limited to this configuration if it is possible to change the kind and direction of the voltage for the primary winding LP1. For example, in the modified example, as shown in FIG. 10, the transmission circuit 10 is configured such that the N-type MOSFET is connected to the power source side, and the P-type MOSFET is connected to the common voltage side. Specifically, in the transmission circuit 10, the circuit connected to the primary winding LP1 of the transformer K3 comprises the negative power source VN11, VN13, VN15, and VN16, transistors M11' to M16', and the diodes D11, D13,D15, and D16.

The source of the transistor M11' is connected to the negative power source VN11, and the source of the transistor M13' is connected the negative power source VN13. Similarly, the source of the transistor M15' is connected to the negative power source VN15, and the source of the transistor M16' is connected the negative power source VN16. Also, the sources of the transistors M12' and M14' are connected to the common voltage, respectively.

One end of the primary winding LP1 is connected to the drain of the transistor M11', the drain of the transistor M15', and the drain of the transistor M14'. The diode D11 is interposed between the one end of the primary winding LP1 and the drain of the transistor M11', to regulate the current flow in the direction from the transistor M11' to the primary winding LP1. Similarly, the diode D15 is interposed between the one end of the primary winding LP1 and the drain of the transistor M15', to regulate the current flow in the direction from the transistor M15' to the primary winding LP1.

Further, the other end of the primary winding LP1 is connected to the drain of the transistor M13', the drain of the transistor M16', and the drain of the transistor M12'. The diode D13 is interposed between the other end of the primary winding LP1 and the drain of the transistor M13', to regulate the current flow in the direction from the transistor M13' to the primary winding LP1. Similarly, the diode D16 is interposed between the other end of the primary winding LP1 and the drain of the transistor M16', to regulate the current flow in the direction from the transistor M16' to the primary winding LP1.

The ON/OFF switching for each of the transistors M11' to M16' is performed by the driving part 100 in the same way as in the second embodiment. Specifically, by causing the transistors M11' and M12' to be ON, and the transistors M13' to M16' be OFF, the primary voltage of the negative power source VN11 is applied to the primary winding LP1. Similarly, by causing the transistors M15' and M12' to be ON, and the transistors M11', M13', M14', and M16' be OFF, the primary voltage of the negative power source VN13 is applied to the primary winding LP1.

Further, by causing the transistors M13' and M14' to be ON, and the transistors M11', M12', M15', and M16' be OFF, the primary voltage of the negative power source VN13 is applied to the primary winding LP1. At this time, the primary voltage of the negative power source VN13 is applied to the primary winding LP1 in the opposite direction of the case when the voltage of the negative power source VN11 is applied. Similarly, by causing the transistors M16' and M14' to be ON, and the transistors M11' to M13', and M15' be OFF, the primary voltage of the negative power source VN16 is applied to the primary winding LP1. At this time, the primary voltage of the negative power source VN16 is applied to the primary winding LP1 in the opposite direction of the case when the primary voltage of the negative power source VN15 is applied.

Therefore, by causing the transistors M12' and M14' to be ON, and the transistors M11', M13', M15' and M16' be OFF, the both ends of the primary winding LP1 are connected to the common voltage. Thereby, the potential difference between the both ends of the primary winding LP1 becomes 0, and the generation of the counter electromotive voltage in the primary winding LP1 is suppressed. That is, the voltage of the secondary winding LS1, that is, the voltage to the ultrasound transducer C10 becomes 0.

As described above, as shown in FIG. 10, the ultrasound diagnosis apparatus according the modified example configures the transmission circuit 10 by connecting the N-type MOSFET to the power source side and the P-type MOSFET to the common voltage side. That is, the number of the P-type MOSFET and the number of the N-type MOSFET required to configure the transmission circuit 10 are reversed of the case of the ultrasound diagnosis apparatus according to the second embodiment (the number of the P-type MOSFET<the numbers of the N-type MOSFET). Thereby, according to each of the trading volumes of the P-type MOSFET and the N-type MOSFET, the configuration according to the second embodiment (see FIG. 5A), and the configuration according to the modified example can be appropriately selected, and it is possible to reduce the production costs of the transmission circuit 10.

EXPLANATION OF SYMBOLS

10 Transmission circuit
K3 Transformer
LP1, LP11, LP12 Primary winding
LS1 Secondary winding
VP11, VP13, VP15, VP16 Power source
VN11, VN13, VN15, VN16 Negative power source
D11, D13, D15, D16 Diode
M11, M11' Transistor
M12, M12' Transistor
M13, M13' Transistor
M14, M14' Transistor
M15, M15' Transistor
M16, M16' Transistor
11 Ultrasound diagnosis transducer group
C10 Ultrasound transducer
12 Amplifier circuit
13 Delay circuit
14 Adding circuit
15 Signal processor
16 Image processor
17 Display
100 Driving part

The invention claimed is:

1. An ultrasound diagnosis apparatus, comprising:
a transformer comprising a primary winding and a secondary winding,
a first power source and a second power source, connected to the primary winding,
an ultrasound transducer configured to be driven by the voltage induced to the secondary winding, transmit ultrasound waves to a subject, and receive reflected waves reflected by the subject to output the received signal,
a processor configured to implement processing on the received signal to generate ultrasound wave images, and
a driving part configured to drive the primary winding to change the voltage among a first level voltage based on the first power source, a zero level voltage, and a second level voltage based on the second power source, and apply a common voltage to both ends of the primary winding to change the voltage across the primary winding to the zero level voltage.

2. The ultrasound diagnosis apparatus according to claim 1, wherein the first power source and the second power source are arranged interposing the primary winding therebetween, and are configured to flow currents for the primary winding in the opposite directions of each other.

3. The ultrasound diagnosis apparatus according to claim 1, wherein the first power source and the second power source are the power sources having the same voltage.

4. The ultrasound diagnosis apparatus according to claim 1, comprising:
a first switch configured to be able to turn on/off the connection between one end of the primary winding and the first power source,
a second switch configured to be able to turn on/off the connection between other end of the primary winding and the second power source,
a third switch configured to be able to turn on/off the connection between one end of the primary winding and a common voltage, and
a fourth switch configured to be able to turn on/off the connection between other end of the primary winding and a common voltage, wherein
the driving part is configured to induce the first level voltage in the secondary winding by turning the first switch and the fourth switch on, and the second level voltage in the secondary winding by turning the second switch and the third switch on, and change the voltage induced from the secondary winding to the zero level voltage by connecting the both ends of the primary winding to the common voltage by turning the third switch and the fourth switch on, and to cause output amplitude from the secondary winding to be 0.

5. The ultrasound diagnosis apparatus according to claim 4, comprising,
as one circuit group including the first power source, the second power source, the first switch, and the second switch,
the other circuit group having the same configuration as the one circuit group, the other circuit group having a third power source and a fourth power source instead of the first power source and the second power source,
wherein
the one circuit group and the other circuit group are connected in parallel to the primary winding, and
the driving part is configured to be able to switch the power source to apply the voltage to the primary winding to any of the first power source, the second power source, the third power source, and the fourth power source by turning the first switch and the fourth switch of either one of the one circuit and the other circuit on, or by turning the second switch and the third switch of either one of the plurality of the circuits on, and turn the third switch and the fourth switch on while switching the power source.

6. The ultrasound diagnosis apparatus according to claim 4, comprising,
as one circuit group including the first power source, the second power source, the first switch, the second switch, the third switch, the fourth switch, and the primary winding,
the other circuit group having the same configuration as the one circuit group, the one circuit group having a third power source and a fourth power source instead of the first power source and the second power source,
wherein the driving part is configured to be able to switch the power source to apply the voltage to the primary winding to any of the first power source, the second power source, the third power source, and the fourth power source by turning the first switch and the fourth switch of either one of the one circuit and the other circuit on, or by turning the second switch and the third switch of either one of the plurality of the circuits on, and, when switching the power source between the first power source and the second power source or between the third power source and the fourth power source to apply the voltage to the primary winding of same circuit group, turn the third switch and the fourth switch connected to the both ends of the primary winding on while switching the power source.

7. The ultrasound diagnosis apparatus according to claim 4, wherein the first switch and the second switch are configured with one of the P-type MOSFETs and the N-type MOSFETs, and the third switch and the fourth switch are configured with the other.

8. A power supply, comprising:
  a transformer comprising a primary winding and a secondary winding,
  a first power source and a second power source, connected to the primary winding, and
  a driving part configured to drive the primary winding to change a voltage to be induced in the secondary winding among a first level voltage based on the first power source, a zero level voltage, and a second level voltage based on the second power source, and apply a common voltage to both ends of the primary winding to change the voltage across the primary winding to the zero level voltage.

9. The power supply according to claim 8, wherein the first power source and the second power source are arranged interposing the primary winding therebetween, and are configured to flow currents for the primary winding in the opposite directions of each other.

10. The power supply according to claim 9, comprising:
  as one circuit group including the first power source, the second power source, the first switch, and the second switch,
  the other circuit group having the same configuration as the one circuit group, the one circuit group having a third power source and a fourth power source instead of the first power source and the second power source,
  wherein:
  the one circuit group and the other circuit group are connected in parallel to the primary winding, and
  the driving part is configured to be able to switch the power source to apply the voltage to the primary winding to any of the first power source, the second power source, the third power source, and the fourth power source by turning the first switch and the fourth switch of either one of the one circuit and the other circuit on, or by turning the second switch and the third switch of either one of the plurality of the circuits on, and turn the third switch and the fourth switch on while switching the power source.

11. The ultrasound diagnosis apparatus according to claim 2, wherein the first power source and the second power source are the power sources having the same voltage.

* * * * *